United States Patent [19]
Asai et al.

[11] Patent Number: 5,779,548
[45] Date of Patent: Jul. 14, 1998

[54] GAME APPARATUS AND METHOD OF REPLAYING GAME

[75] Inventors: Toshinori Asai; Takayuki Yanagihori, both of Tokyo, Japan

[73] Assignee: Sega Enterprises, Ltd., Tokyo, Japan

[21] Appl. No.: 602,854

[22] PCT Filed: Jun. 27, 1995

[86] PCT No.: PCT/JP95/01277

§ 371 Date: Feb. 27, 1996

§ 102(e) Date: Feb. 27, 1996

[87] PCT Pub. No.: WO96/00601

PCT Pub. Date: Jan. 11, 1996

[30] Foreign Application Priority Data

Jun. 28, 1994 [JP] Japan .................. 6-146835

[51] Int. Cl.$^6$ .................................................. A63F 9/22
[52] U.S. Cl. .................................................. 463/31; 463/1
[58] Field of Search ............................ 463/1, 7, 29, 30, 463/31, 33, 40; 364/410; 348/451, 452; 345/121, 122, 126, 129, 130, 131; 395/118, 133, 137

[56] References Cited

U.S. PATENT DOCUMENTS

| | | | |
|---|---|---|---|
| 4,342,454 | 8/1982 | Baer et al. | 463/31 |
| 5,261,828 | 11/1993 | Slye et al. | 463/1 |
| 5,395,242 | 3/1995 | Slye et al. | 463/7 |
| 5,507,485 | 4/1996 | Fisher | 364/410 |
| 5,558,339 | 9/1996 | Perlman | 463/41 |

OTHER PUBLICATIONS

Video Game Manual: "XWING, Rebel Alliance, Manuel du pilote to starfighter", 1992 XP002012953 (with partial English translation).

Video Game Manual: Red Baron, Documentation Historique & Manuel d'Instructions, 1991 XP002012954 (with partial English translation).

*Primary Examiner*—Jessica Harrison
*Assistant Examiner*—Mark A. Sager
*Attorney, Agent, or Firm*—Price, Gess & Ubell

[57] ABSTRACT

A game apparatus and a method of replaying a game display a moving entity which moves in a given area on a display screen. The game apparatus has a memory for storing, for a predetermined period of time, absolute coordinates in the predetermined area of a moving entity which moves in the predetermined area in response to a control signal entered by an operator while a game is in progress, and a display data generating unit or reading the absolute coordinates from the memory in response to a replay request from the operator and processing the absolute coordinates into display data depending on processing information supplied from an input unit by the operator.

43 Claims, 17 Drawing Sheets

GAME APPARATUS AND METHOD OF REPLAYING GAME

TECHNICAL FIELD

The present invention relates to a game apparatus and a method of replaying a game, and more particularly to a game apparatus and a method of replaying a game for displaying a moving entity which moves in a given area on a display screen.

More particularly, the present invention is concerned with a game apparatus and a method of replaying a game for displaying, on a display screen, an object which moves in a given area according to a control signal from the operator and a predetermined game program, and for replaying the movement of the object on the display screen under a replay condition designated by a replay command.

BACKGROUND ART

There have heretofore been known various television games including sports games of soccer, hockey, basket ball, tennis, golf, etc. In such a sports game, the operator controls a ball (or a puck) that has been moved by a player in the game within a given play area to shoot at a goal in a given position, or hit the ball into a court or a cup, thus gaining a point. Other television games include martial art games in which players move in a given combat area and exchange tricks or techniques to win the game.

Some game apparatus for playing sports games and martial art games have a save function and a replay function.

The save function allows the operator to store the data of a game at the time it is interrupted into a memory (RAM) and also allows the operator to read the stored data from the memory when the game is resumed, so that the operator can continuously play the game.

The replay function stores the data of a game, as it is constantly updated, for a certain period of time while the game is in progress, and permits the operator to pause in the game when an excellent or rare situation, such as a nice goal or superb technique, occurs during the game, storing several scenes of the situation into another RAM. After the game, the operator can select a desired excellent or rare situation from the stored scenes for replay.

According to the replay function of the conventional game apparatus, however, replayed images of a game are displayed only from the same viewpoint at the same size in the same sequence as the images that were displayed while the game was in progress, and it is impossible to reproduce the excellent or rare situation as viewed from a viewpoint different from that of the actual game under way, for the operator to see. Another problem is that the operator cannot view scenes in an enlarged or reduced scale. The conventional game apparatus are designed such that they do not permit the operator to change freely the position itself of a viewpoint for game display, but they display images only at a given fixed angle, while a game is going on.

In the conventional game apparatus, the replay function has been performed by storing a history of control signals from a control pad which is operated by the operator during a game. When a replay command is issued, the game apparatus reads the stored history of control signals and processes image data in the same manner as in the game to play back game scenes. The reason for the above process of performing the replay function is that the memory used is of the simplest structure.

Therefore, scenes to be reproduced cannot be played in a sequence which is a reversal of the sequence of the game in progress. This is because a control signal from the control panel is entered based on the selection of a control action depending on a previous situation in the game, and a game scene cannot be played back with only control signals from the control pad unless information about a previous situation in the game is available.

In the game apparatus, the position of an object to be displayed next in a game is calculated from a control signal from the control pad and a previous situation in the game according to the algorithm of a given game program thereby to generate display data, and display the data on a display monitor. Depending on the calculating process, game scenes may not be reproduced in a fast-forward mode or a slow-motion mode. Furthermore, it may not be possible to reproduce game scenes while moving the viewpoint of the display screen (corresponding to the viewpoint of the camera), and to play back game scenes while enlarging or reducing the image through zooming in, zooming out, etc.

It is therefore an object of the present invention to provide a game apparatus which will solve the above problems.

Another object of the present invention is to provide a game apparatus which can freely replay a game according to a command signal for reverse play, fast-forward, slow-motion, etc.

Still another object of the present invention is to provide a game apparatus which allows the viewpoint of a display screen (the viewpoint of a camera) to be moved or allows images to be zoomed in or zoomed out while a game is being replayed.

DISCLOSURE OF THE INVENTION

The above problems can be solved by the following arrangement of the present invention:

According to the present invention, there is provided a game apparatus comprising memory means for storing, for a predetermined period of time, absolute coordinates in a predetermined area of a moving entity which moves in the predetermined area in response to a control signal entered by an operator while a game is in progress, display data generating means for reading the absolute coordinates from the memory means in response to a replay request from the operator and processing the absolute coordinates into display data depending on processing information supplied from an input unit by the operator, and display control means for replaying and displaying the moving entity on a display screen based on the display data.

The memory means stores, for a predetermined period of time, absolute coordinates in the predetermined area of the moving entity which moves in the predetermined area in response to the control signal entered by the operator while the game is in progress. The display data generating means reads the absolute coordinates from the memory means in response to the replay request from the operator and processes the absolute coordinates into display data depending on processing information supplied from the input unit by the operator. Therefore, it is possible to generate display data different from the display data generated while the game is in progress. In response to the replay request, the moving entity can be displayed on the display screen based on display data, e.g., rotated, enlarged, or reduced display data, different from the display data generated while the game is in progress.

The above objects of the present invention can be achieved by a method of replaying a game in which objects are moved in a predetermined area in response to a control signal entered by an operator while the game is in progress.

comprising the steps of determining absolute coordinates and movement data of a first object in an absolute coordinate space established in the predetermined area in response to the control signal entered by the operator with respect to images displayed while the game is in progress, determining absolute coordinates and movement data of a second object in the absolute coordinate space based on the absolute coordinates and the movement data of the first object according to a predetermined algorithm of a game program, storing a history of the absolute coordinates and the movement data of the first and second objects in a memory, reading the absolute coordinates and the movement data of the first and second objects from the memory in response to input information indicative of a replay command and a replay mode from the operator, processing the absolute coordinates and the movement data which are read for a perspective conversion according to the input information indicative of a replay mode, thereby generating image data of the first and second objects to be displayed, and displaying the generated image data.

When a replay request is issued, since the history of positions and movements in the absolute coordinate space of the objects in the game has already been stored in the memory, scenes of the game can be replayed in various replay modes by entering a sequence of reading the data, a viewpoint and the direction of a field of view used in calculations to change perspectives, and zooming in or zooming out, as replay mode information from the operator. Inasmuch as the data of the objects that have been generated while the game is under way are used, it is not necessary to calculate the data again for replay, but the data of the objects for respective frames are mechanically processed for a perspective conversion. Consequently, desired scenes can be replayed without imposing an undue burden on a CPU.

BEST MODE FOR CARRYING OUT THE INVENTION

[1st Embodiment]

Figure 1:
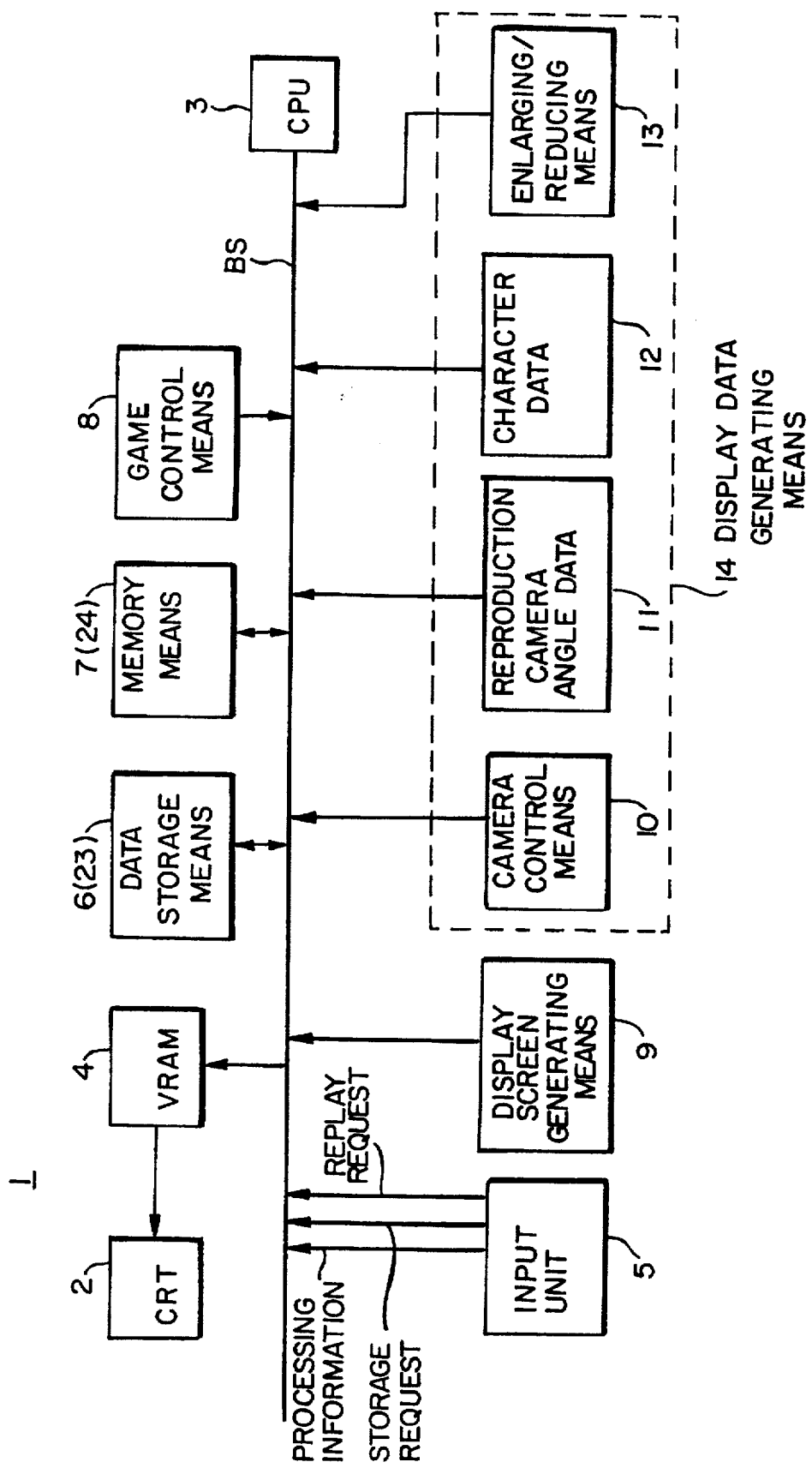
FIG. 1 is a block diagram of a game apparatus according to a first embodiment of the present invention.

A game apparatus according to a first embodiment of the present invention will be described below. FIG. 1 shows in block form a game apparatus 1 according to a first embodiment of the present invention. The game apparatus 1 shown in FIG. 1 is implemented by a hardware arrangement shown in FIG. 2. The arrangements shown in FIGS. 1 and 2 are substantially equal to each other except that some components (21, 22, 25, 26, 27) shown in FIG. 2 are omitted from illustration in FIG. 1 for the sake of brevity and some components (8, 9, 14) not shown in FIG. 2 are added to FIG. 1.

Figure 2:
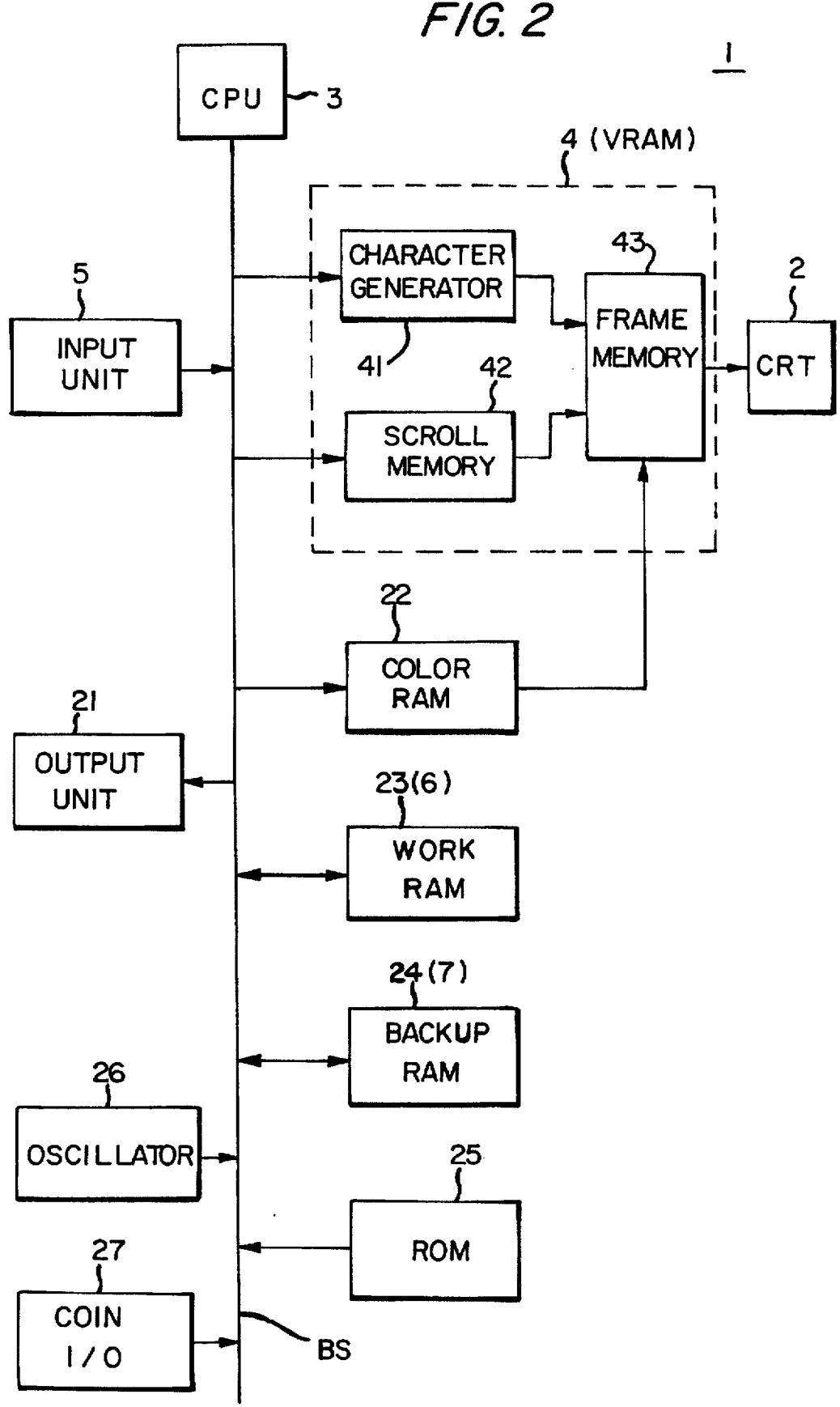
FIG. 2 is a block diagram of the game apparatus according to the first embodiment of the present invention.

The game apparatus 1 shown in FIG. 2 is designed to play a soccer game, for example. The game apparatus 1 has an input unit 5 which can be operated by the operator to move players freely to cause them to kick a ball, a CRT 2 for displaying images, and an output unit 21 composed of a sound generator and speakers for generating effect sounds including a sound produced when the ball is kicked, cheers from spectators, etc.

The game apparatus 1 also has a CPU (central processing unit) 3, a VRAM (video random-access memory) 4, a color RAM 22, a work RAM 23 for calculating data for a game, a backup RAM 24, a ROM (read-only memory) 25, and an oscillator 26, which are all connected to a data bus BS. The VRAM 4 comprises a character generator 41, a scroll memory 42, and a frame memory 43, and generates one frame of image data at a time.

The character generator 41 generates foreground image data (representing a player not scrolled) from character data stored in the ROM 25. The player corresponds to a moving entity. The scroll memory 42 calculates a distance by which a background image is to be scrolled, based on a command from the CPU 3 according to an input signal from the input unit 5, and generates background image data which will be scrolled.

These foreground and background image data are supplied to the frame memory 43. Players which are freely movable on a ground, which is scrolled and displayed on the CRT 2, according to input signals from the input unit 5 are displayed, together with a background image including the ground and members of the opponent team, on the CRT 2 for the operator to enjoy the soccer game.

Displayed images are colored when the color RAM 22 imparts color data to frame images. The CPU 3 carries out a process, described later on, according to a soccer game program stored in the ROM 25. If the game apparatus is for home use, then the ROM 25 should preferably be in the form of a cartridge or a CD(compact disk)-ROM that can be inserted into and removed from the game apparatus. Therefore, the game apparatus allows the operator to enjoy other games than the soccer game. The oscillator 26 serves to generate a clock signal for synchronizing the components of the game apparatus.

If the game apparatus is an arcade game machine, then a coin I/O 27 is further connected to the data bus BS. When a coin of predetermined denomination is inserted as detected by the coin I/O 27, the game apparatus is brought into a condition ready to start the game by a signal from the coin I/O 27. The work RAM 23 includes an area for storing absolute coordinates of players on the ground while the game is in progress, for a given period of time. The absolute coordinates are not the coordinates of displayed positions of players on the display screen of the CRT 2, but absolute coordinates of polygons of players in a region where the players move. The absolute coordinates of each of the players are stored in the work RAM 23 for 10 seconds, for example, at all times, and old coordinate data are updated as the game progresses.

The absolute coordinates of each of the players are transferred to the backup RAM 24 according to a storage request from the input unit 5. The backup RAM 24 has a storage capacity large enough to store such absolute coordinates transferred a plurality of times.

Referring to FIG. 1, those parts shown in FIG. 1 which are identical to those shown in FIG. 2 are denoted by identical reference numerals, and will not be described in detail below.

As shown in FIG. 1, the game apparatus 1 has a data storage means 6 which corresponds to the work RAM 23, a memory means 7 which corresponds to the backup RAM 24, and a game control means 8 for controlling movement of the game in its entirety. The game apparatus 1 also has a display screen generating means 9, a camera control means 10, reproduction camera angle data 11, character data 12, and an enlarging/reducing means 13. The camera control means 10, the reproduction camera angle data 11, the character data 12, and the enlarging/reducing means 13 jointly make up a display data generating means 14.

Figure 3:
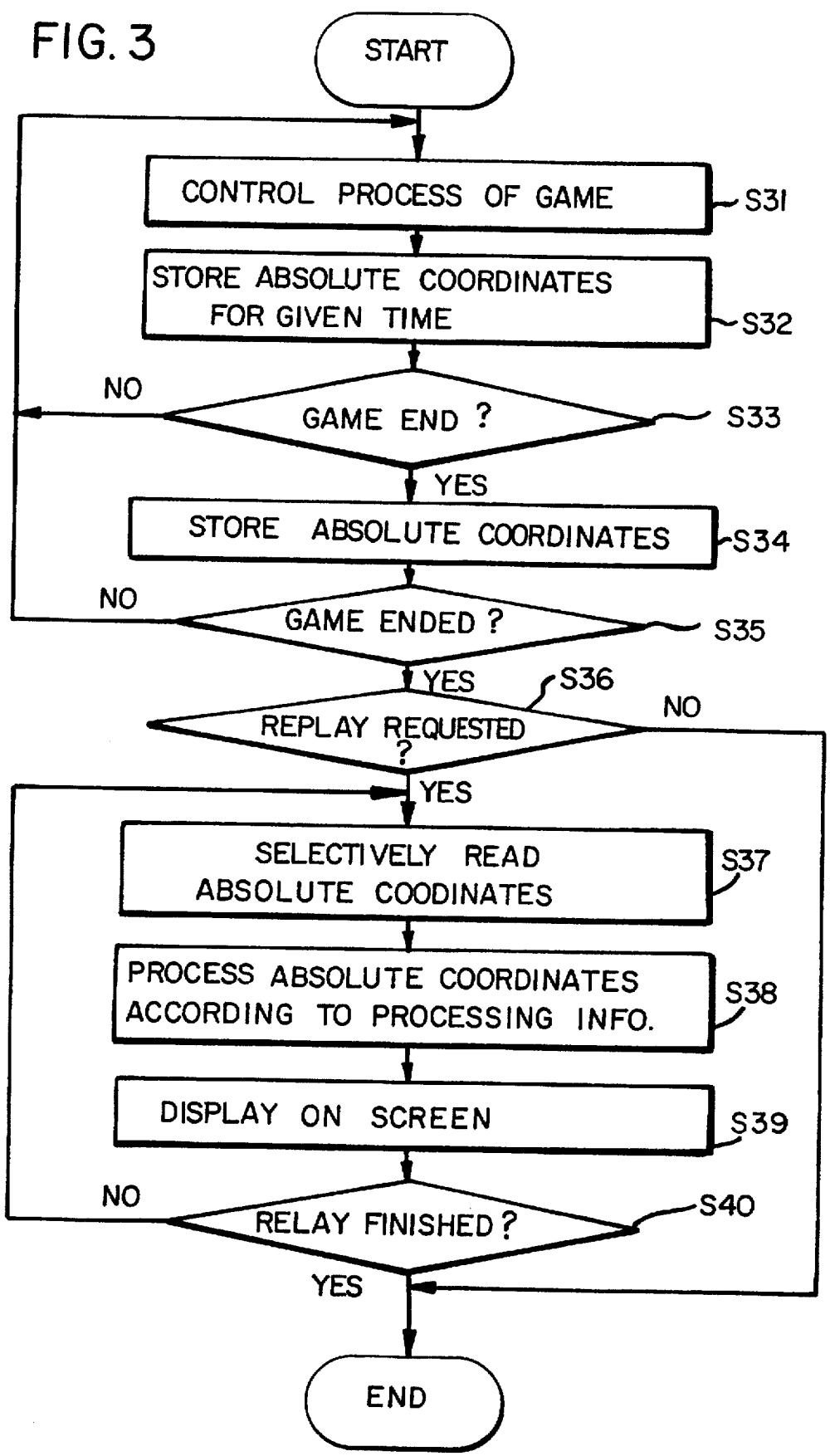
FIG. 3 is a flowchart of an operation sequence of the game apparatus according to the first embodiment of the present invention.

FIG. 3 shows an operation sequence of the game apparatus 1 which is controlled by the CPU 3. The operation sequence will be described below with reference to FIGS. 2 and 3.

In a step S31, the progress of the game is controlled by the game control means 8. The absolute coordinates of respective players (moving entities) on the ground while the game is in process are written into the data storage means 6 from time to time in a step S32. The absolute coordinates for a predetermined period of time, e.g., 10 seconds, are stored in the data storage means 6, thus updating old coordinate data.

When the absolute coordinates for the predetermined period of time are stored in the data storage means 6, the CPU 3 determines whether there is a storage request from the input unit 5 or not in a step S33. A storage request can be issued from the input unit 5 when the operator operates the input unit 5 if he wishes to store a nice shooting scene or the like. If there is not a storage request (No), then the processing returns to the step S31 and the game continues. If there is a storage request (Yes), then the CPU 3 transfers the absolute coordinates of all the players which are stored in the data storage means 6 for 10 seconds to the memory means 7, which stores the transferred absolute coordinates in a step S34.

In a step S35, the CPU 3 determines whether the game is finished or not. If not finished (No), then the processing returns to the step S31 and repeats the steps S31~S35. Therefore, when a plurality of storage requests are made, the absolute coordinates of players at a plurality of scenes for a plurality of periods of 10 seconds are stored in the memory means 7.

If the game is finished (Yes) in the step S35, then the CPU 3 determines whether there is a replay request from the input unit 5 or not in a step S36. A replay request can be issued from the input unit 5 when the operator operates the input unit 5 if he wishes to replay a nice shooting scene or the like. If there is no replay request (No), then the processing comes to an end.

If there is a replay request (Yes) in the step S36, then the CPU 3 selects some of the absolute coordinates of the players at the scenes for all the periods of 10 seconds which are stored in the memory means 7, depending on a selection made by the operator, and reads the selected absolute coordinates from the memory means 7.

The absolute coordinates read from the memory means 7 are processed according to processing information from the input unit 5 in a step S38, generating display data which are different from those displayed during the game. For example, the operator operates the input unit 5 as desired while viewing the replayed display screen, for generating display data with which to display a rotated, enlarged, or reduced image.

The display of a rotated image will be described below. The character data 12 include a plurality of character data representing each character or player as viewed in various directions. The camera control means 10 selects reproduction camera angle data 11 depending on the processing information from the input unit 5, selects character data 12 according to the selected reproduction camera angle data 11, and transfers the selected character data 12 to the display screen generating means 9. At this time, the direction of the selected character data 12 can vary, i.e., the viewpoint of the camera varies, depending on the operation of the input unit 5.

When the character data 12 is transferred from the display screen generating means 9 to the CRT 2 through the VRAM 4, a nice shooting scene as viewed from viewpoints different from the viewpoint during the game is displayed, as it rotates, on the screen of the CRT 2 in a step S39.

When one scene is replayed and displayed in the step S39, the CPU 3 determines whether the replaying process is to be finished or not in a step S40. If to be finished (Yes), then all the processing is ended. If not to be finished (No), then the processing goes back to the step S37, and repeats the steps S37~S40.

If the operator operates the input unit 5 to display an image at an enlarged or reduced scale in the step S38, then the image is displayed at an enlarged scale by inserting dots uniformly or at a reduced scale by deleting dots uniformly. Therefore, the image is displayed at a distance between the camera and the character (player), which is different from the distance during the game, so that the operator can display the image at an enlarged or reduced magnification ratio as he wishes. The image may be enlarged or reduced in scale by any of various means other than the insertion or deletion of dots.

According to the above embodiment, the operator can store excellent or rare situations of a game and then replay and display the stored excellent or rare situations, as they may be rotated, enlarged, or reduced, as viewed from viewpoints different from the viewpoint while the game is in progress. As a result, the operator can enjoy the game a number of times, and have manifold fun playing the game.

[2nd Embodiment]

A game apparatus according to a second embodiment of the present invention will be described below.

The game apparatus according to the second embodiment will be described with respect to the playing of a soccer game. However, the game apparatus according to the second embodiment is not limited to a soccer game, but may be used to play various types of games.

[General description of the 2nd embodiment]

In response to a control signal which is entered from a control pad by the operator with respect to the direction of a display screen while the operator is viewing the display screen during a soccer game, the game apparatus according to the second embodiment processes movements of a player and a ball in the soccer game according to the algorithm of a soccer game program, thereby determining the positions of a player and a ball to be displayed next, and the pattern of a picture to be displayed next. According to this process, a control signal from the control pad is translated based on a situation in the game being displayed, calculating to which positions 22 players and one ball are to be moved, in which directions they are to be moved, and what movements they are to make, i.e., movement data, in an absolute coordinate space in the game.

The absolute coordinates are not coordinates in a space corresponding to the display screen, but coordinates arbitrarily established in a region in which objects such as players move. The absolute coordinate space is a fixed coordinate system which is not varied by the position or direction of a viewpoint for display.

The operator controls one of the 22 players through the control pad. If there are two operators, then they control two of the 22 players through the control pad. The player that is directly controlled by the operator is referred to as a first object. The game apparatus processes movements of the ball according to the algorithm of the soccer game program, determining movement data of the remaining players (21 or 20 players), i.e., the positions to which the remaining players are to be moved, and the pattern of a picture to be displayed. This process is carried out in the absolute coordinate space during the game. The players that are indirectly controlled are referred to as a second object.

From the positions, in the absolute coordinate space, of objects as the players and the ball and the type of the pattern of the picture thus obtained, the objects are then processed for a perspective conversion based on viewpoint information of the display screen. The viewpoint information of the display screen contains the position and direction of a camera used to image the game, i.e., the viewpoint and the direction of the camera or the vision. For the perspective conversion, information with regard to zooming in and zooming out of the camera, i.e., enlarging and reducing information is also used. The perspective conversion is a process of converting three-dimensional data representing various objects that exist in various positions in various forms in the absolute coordinate space, into two-dimensional data on a two-dimensional display screen which is determined by the position, direction, zooming in, and zooming out of the camera.

More specifically, the perspective conversion is a two-step conversion process for converting the absolute coordinate space into a display space based on viewpoint information (mainly directional conversion), and converting three-dimensional data in the display space into two-dimensional data on the display screen.

Information regarding the position, direction, zooming in, and zooming out of the camera is entered from the control pad by the operator.

According to the second embodiment, the position (coordinates) of an object which has been processed and the type of the pattern of a picture (movement data) are stored in a memory at all times. When a replay command is entered by the operator, the data stored in the memory is processed for displaying an image, and pixels of display image data are stored in a frame buffer memory. Then, the display image data are reproduced on a display monitor.

Concurrent with the replay command, the operator also enters commands with respect to replay modes indicative of how an image is to be replayed, i.e., reverse play, fast-forward, slow-motion, or the like, and at which camera angle an image is to be replayed. According to the entered commands of replay modes, the perspective conversion is processed to generate display image data.

The game apparatus according to the second embodiment will be described in greater detail below.

[Arrangement of the game apparatus]

Figure 4:
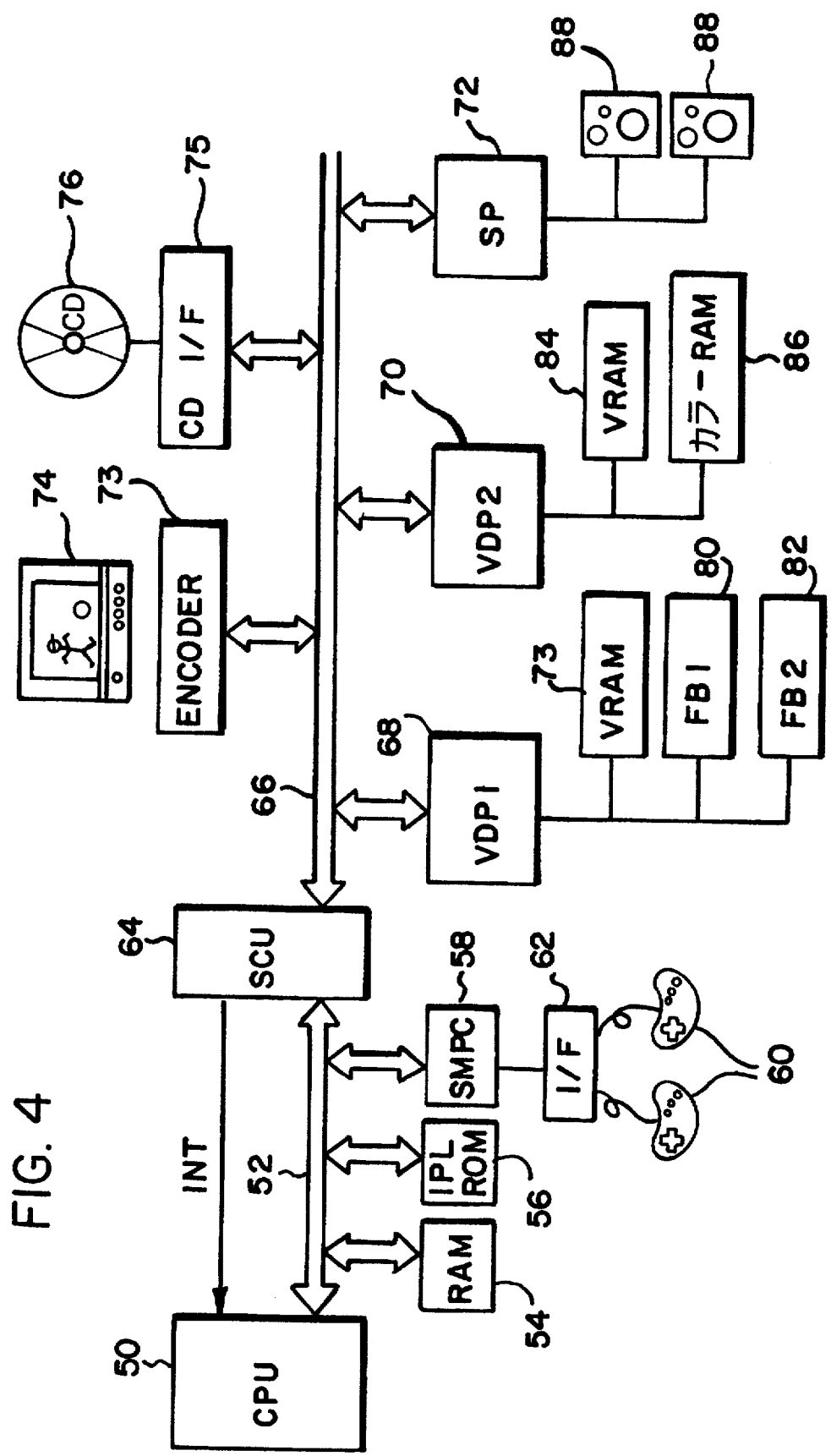
FIG. 4 is a block diagram of a game apparatus according to a second embodiment of the present invention.

FIG. 4 shows a schematic block diagram of the game apparatus according to the second embodiment of the present invention.

As shown in FIG. 4, the game apparatus has a main central processing unit (CPU) 50 for processing images according to a game program. The main CPU 50 is connected through a CPU bus 52 to a work memory for storing data being processed, i.e. a random-access memory (RAM) 54 for storing data which has been processed, a game program and image data of objects supplied from an external source, a read-only memory (ROM) 56 for storing a program (IPL, Initial Program Load) for loading an initial program, and a system manager/peripheral control unit 58 for controlling resetting management of the entire system and an interface with external devices such as control pads 60 or the like. An interface circuit 62 is connected between the system manager/peripheral control unit 58 and the control pads 60.

A system controller unit (SCU) 64 serves as a coprocessor for the CPU 50, and controls the bus 52 and a bus 66 connected thereto. The SCU 64 has a direct memory access (DMA) controller for transferring character data of objects to an image memory (VRAM) 78 while the main CPU 50 is in operation.

To the SCU 64, there are connected through the bus 66 a first video display processor (VDP1) 68, a second video display processor (VDP2) 70, an audio processor 72, a display monitor 74, and a CDROM (compact disk ROM) 76. A CDROM interface 75 is connected between the CDROM 76 and the bus 66. If the game apparatus is for home use, then the display monitor 74 is externally connected to the game apparatus, and the medium of the CDROM 76 is installed in a CD drive of the game apparatus.

The first video display processor 68 is a processor for controlling objects such as players and a ball which move in a soccer field. To the first video display processor 68, there are connected a video memory 78 for storing video processing commands and character data of objects which are written by the CPU 50, and two frame buffers 80, 82 for storing pixels of image data to be displayed. The second video display processor 70 is a processor for controlling the display of a background image. To the second video display processor 70, there are connected a video memory 84 and a color memory 86 for storing color information. A pair of speakers 88 is connected to the audio processor 72. If the game apparatus is for home use, then the speakers 88 are externally connected to the game apparatus.

The CDROM 76 stores image data including the soccer game program, character data representing objects such as players and a ball in the soccer game, data representing the field, and data representing soccer goals. The image data stored in the CDROM 76 are loaded into the memory 54 when necessary while the game is in progress.

[Absolute coordinates]

Figure 5:
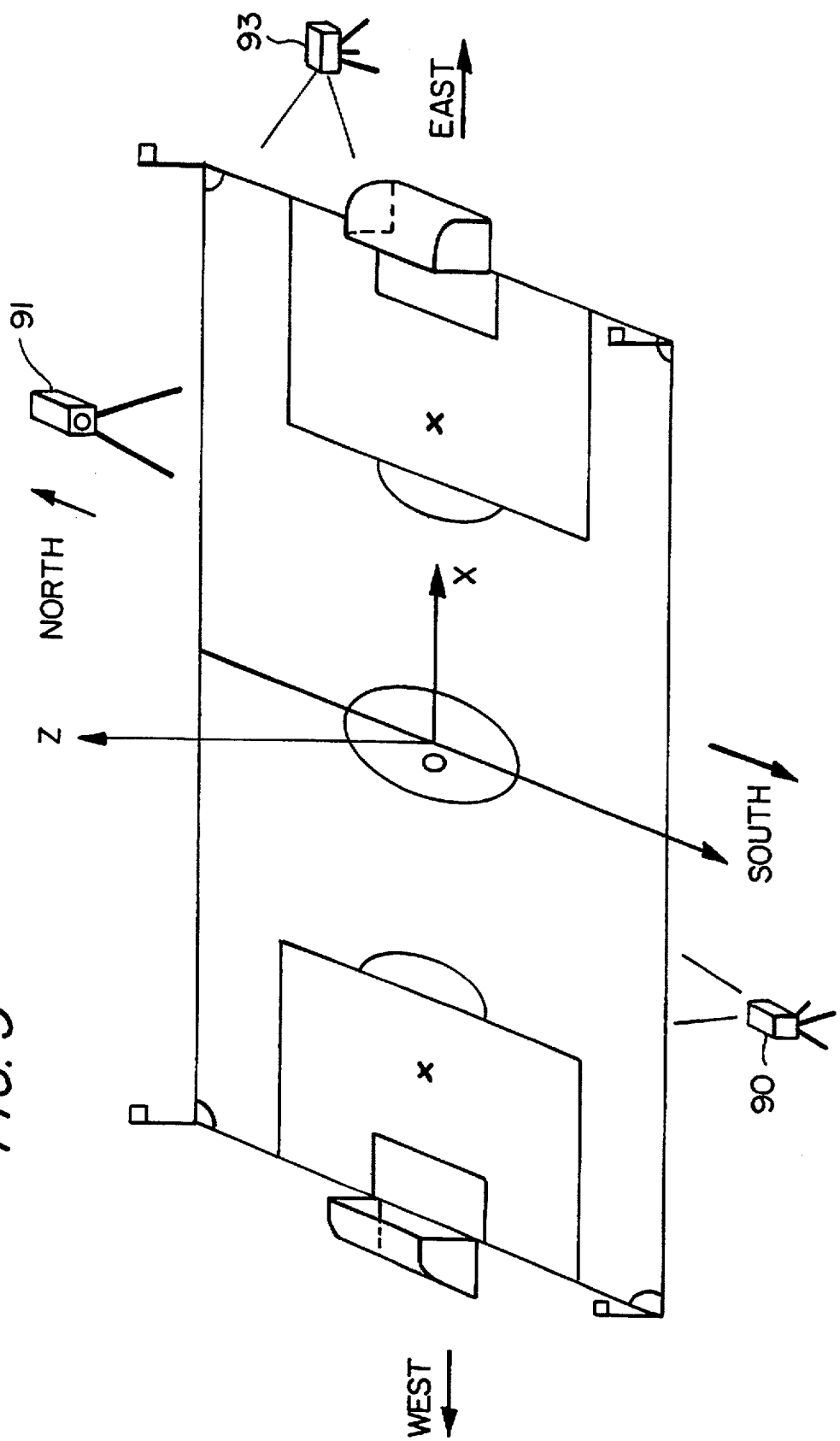
FIG. 5 is a perspective view of a soccer field, the view being illustrative of an absolute coordinate system.

Absolute coordinates in the game apparatus according to the second embodiment will be described below. FIG. 5 shows a soccer field, illustrative of an absolute coordinate system.

It is assumed that the soccer field extends in eastward and westward directions and has goals positioned respectively in east and west ends thereof. The soccer field has its center 0 defined as the origin of the absolute coordinate system. An X-axis extends from the origin 0 in the eastward direction, a Y-axis extends from the origin 0 in the southward direction, and a Z-axis extends upwardly from the origin 0.

The space composed of the system of the X-, Y-, and Z-axes thus defined is referred to as an absolute coordinate space.

According to the second embodiment, the soccer game proceeds in the absolute coordinate space. The main CPU 50 effects image processing based on the absolute coordinate space.

The absolute coordinates are defined for the following reasons: If the soccer field is viewed through a camera 90 shown in FIG. 5, then the right-hand side in the camera angle is eastward, pointing to the positive direction along the X-axis, and the left-hand side in the camera angle is westward, pointing to the negative direction along the X-axis. The far side away from the camera 90 is northward, pointing to the negative direction along the Y-axis, and the near side closer to the camera 90 is southward, pointing to the positive direction along the Y-axis, i.e., the position becomes closer to the camera 90 from the origin 0 in the positive direction along the Y-axis. If the soccer field is viewed through a camera 91 shown in FIG. 5, then the right-hand side in the camera angle is westward, pointing to the negative direction along the X-axis, and the left-hand side in the camera angle is eastward, pointing to the positive direction along the X-axis. If the soccer field is viewed through a camera 93 on the east side of the soccer field shown in FIG. 5, then the right-hand side in the camera angle is northward, pointing to the negative direction along the Y-axis, and the left-hand side in the camera angle is southward, pointing to the positive direction along the Y-axis.

First, therefore, it is necessary to translate control signals entered by the operator based on the space corresponding to the display screen into directions in the absolute coordinate space.

Secondly, it is necessary to convert processed results of image data obtained in the absolute coordinate space into positions and directions in the display screen based on the position and direction of the viewpoint which is represented by the position of the camera. Since the position and direction of the camera is indicated by a command signal entered from the control pad by the operator, it is necessary to convert image data in the absolute coordinate space into image data in the coordinate space in the camera angle, i.e., the display screen. While the position and direction of the camera as indicated by the operator tends to vary from time to time, the absolute coordinate space is fixed at all times, and data processing at the time the game is in progress is carried out in the absolute coordinate space.

[Image processing sequence]

Figure 6:
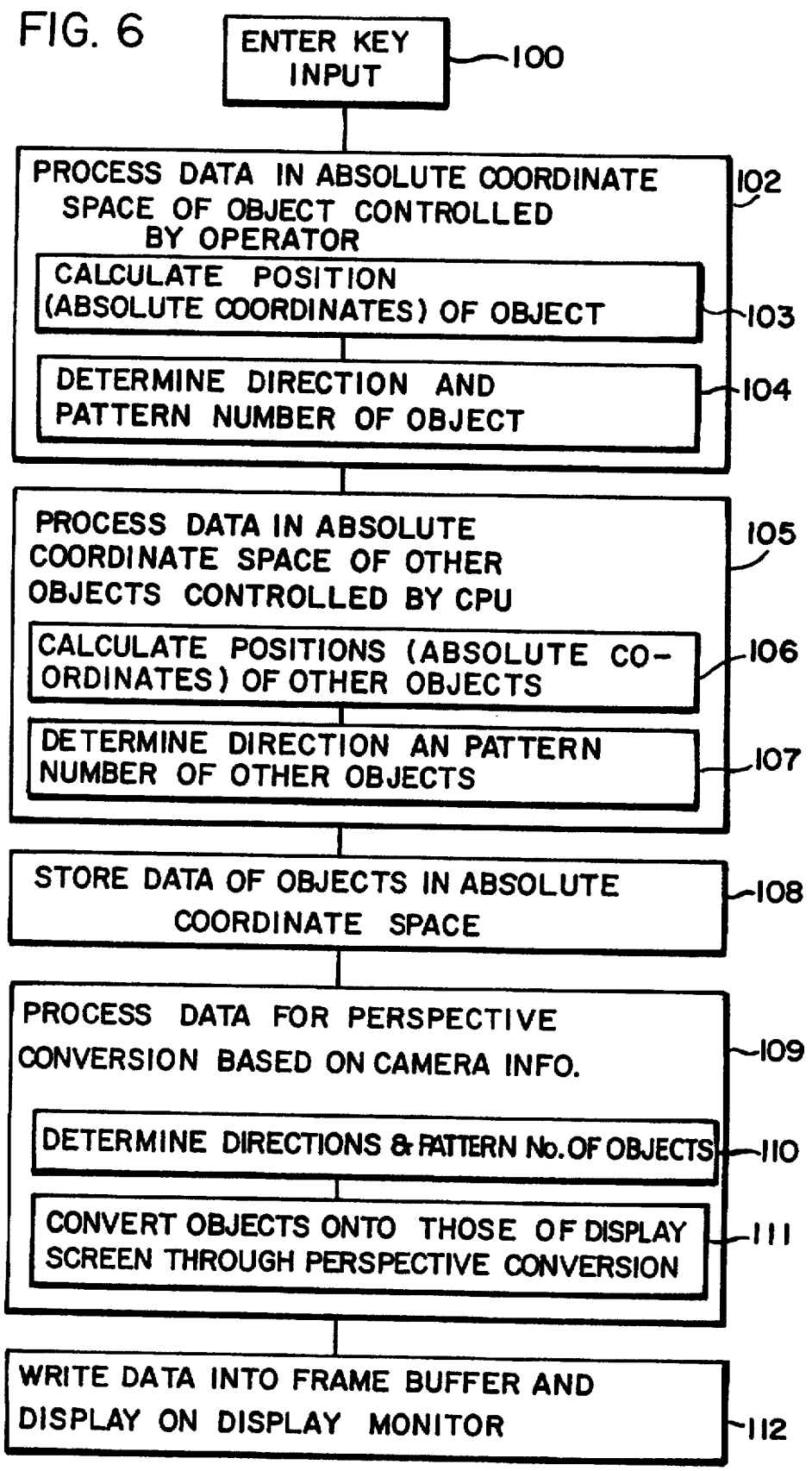
FIG. 6 is a flowchart of an image processing sequence of the game apparatus according to the second embodiment of the present invention.

FIG. 6 shows an image processing sequence of the game apparatus according to the second embodiment of the present invention.

The image processing sequence will briefly be described below with reference to FIGS. 4 and 6.

First, the operator enters a key input through the control pad in a step 100. While viewing a displayed image on the display monitor as the game is in progress, the operator operates the control pad to indicate a direction in which to move the player and a type of movement, e.g., standing, running, kicking, or the like, to be made by the player.

According to the entered indications, the main CPU 50 processes data in the absolute coordinate space for the object which is the single player in a step 102. Specifically, the main CPU 50 calculates absolute coordinates of the object in a step 103 and determines a type and direction of movement of the object as movement data and a pattern number in a step 104. Details of these steps will be described later on. The single player is controlled by the operator. If there are two operators, then two players are controlled by the respective operators.

When the single player moves, the object of the soccer ball also moves. Therefore, data are also calculated for the soccer ball in the step 102.

In a next step 105, the main CPU 50 calculates movements of objects as other players according to the positional information of the soccer ball which has moved in the soccer field. The main CPU 50 calculates movements of these objects according to the algorithm of a given game program. For example, while maintaining a certain formation between players, a player positioned closely to the soccer ball moves toward the soccer ball, and a player positioned remotely from the soccer balls moves in a range which keeps the formation intact. This process poses a considerable burden on the main CPU 50 because the number of objects to be processed is large.

In the step 105 which will be described in detail later on, the main CPU 50 determines absolute coordinates (positions) of the other players (objects) controlled by the main CPU 50 in a step 106 and also determines directions and pattern numbers of the other objects in a step 107.

The data of the objects thus obtained in the absolute coordinate space are stored in the memory 54 by the main CPU 50 in a step 108. Specifically, the data of the objects which are determined in respective frames are stored in a replay data area of the memory 54. The replay data area of the memory 54 is of a storage capacity large enough to store several seconds of frames. Addresses at which to store the data are generated by adding the first address of the replay data area of the memory 54 to the count of a ring counter. Therefore, the replay data area of the memory 54 can store the latest several seconds of data at all times. If the display monitor displays 60 frames a second and 8 seconds of data should be replayed, then the random-access memory 54 has a storage capacity capable of storing 480 frames of data of objects.

Then, the game apparatus processes a perspective conversion based on the absolute coordinates of the objects (the players and the ball) in the absolute coordinate space, the types and directions of movements of the objects, and the pattern numbers, according to a control signal which the operator enters for a replay mode with respect to the position and direction of the camera in a step 109. The perspective conversion in the step 109 converts three-dimensional data in the absolute coordinate space into two-dimensional data in the display space.

As described in detail later on, the perspective conversion in the step 109 includes a step 110 of determining the directions of the objects and the pattern numbers thereof again so as to match the display screen, and a step 111 for converting the objects into those on the display screen through the perspective conversion.

Pixels of the image data thus produced are stored in either one of the frame buffers 80, 82 by the first image display processor 68. The two frame buffers 80, 82 are employed because while image data are being written into one of the frame buffers 80, 82, image data stored in the other frame buffer can be read and reproduced on the display monitor 74 in a step 112. Thus, it is possible to carry out a complex and time-consuming process of processing and writing image data without affecting the soccer game that is being under way.

The perspective conversion based on the camera information is carried out by the main CPU 50. Commands and character data produced as a result of the perspective conversion are written into the video memory 78 through the system controller unit 64 by the main CPU 50. The first video display processor 68 processes the commands and the character data in an indicated sequence to write pixels of image data into the frame buffers 80, 82.

Commands and data required for displaying a background image other than the objects are similarly written into the video memory 84 through the system controller unit 64 by the main CPU 50. Pixels of the background image are then generated according to the commands by the second video display processor 70.

Finally, the second video display processor 70 combines or merges the pixels of image data of the objects in the frame buffer and the data of the background image according to a given priority algorithm, and displays the merged image data on the display monitor 74.

The image processing sequence of the game apparatus according to the second embodiment has briefly been described above.

[Data structure of objects]

The objects such as the players and the ball will specifically be described below.

Figure 7:
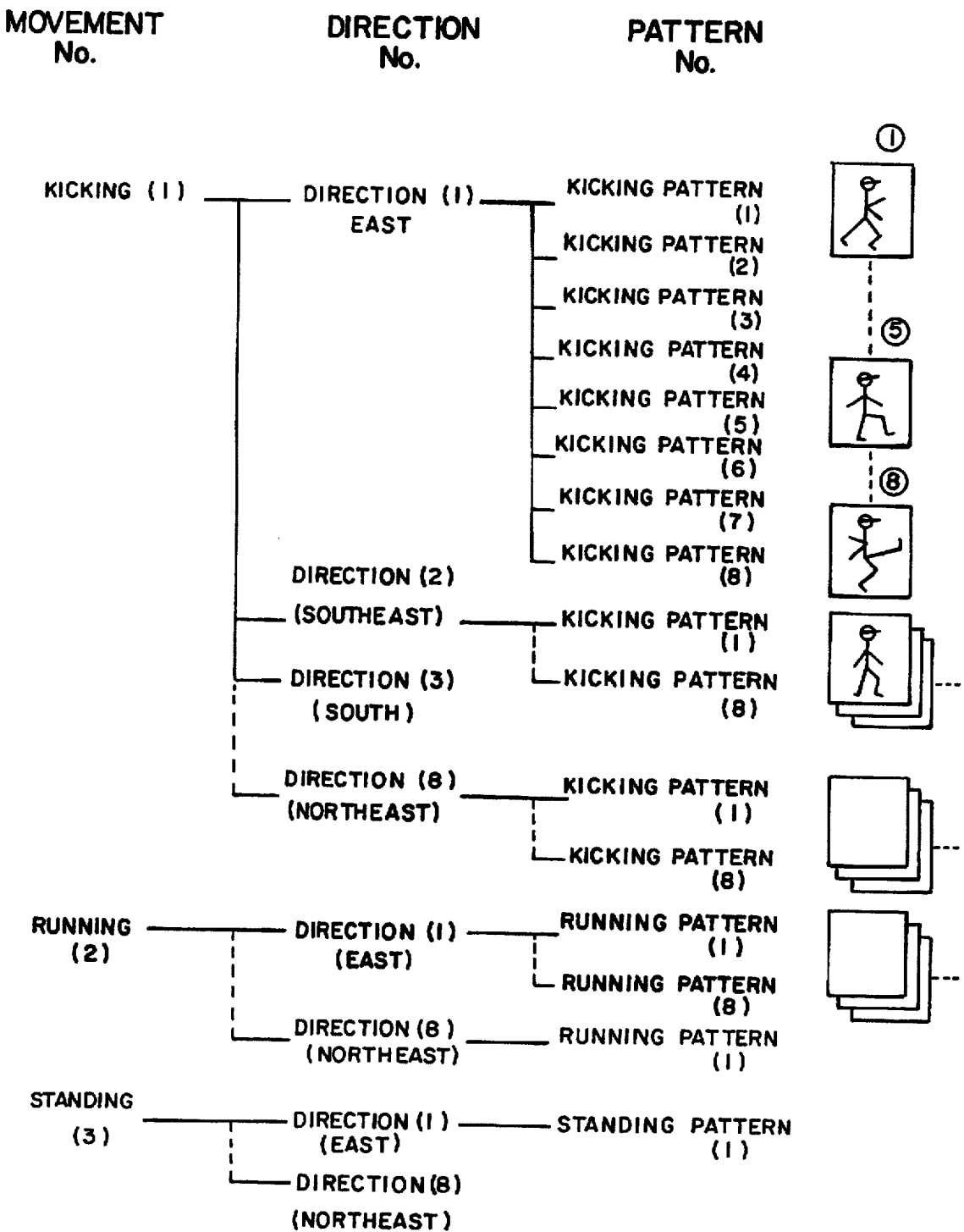
FIG. 7 is a table showing a data structure of objects as players.

FIG. 7 is a table showing a data structure of objects as players. Data of an object are composed of absolute coordinates of the object in the absolute coordinate space, movement numbers, movement directions, and pattern numbers. As shown in FIG. 7, a movement number (1) represents a "kicking" movement. The kicking movement is associated with attributes with respect to directions and attributes with respect to a series of pattern numbers. The attributes with respect to directions indicate eight directions, i.e., east, southeast, south, southwest, west, northwest, north, and northeast. To these attributes, there may be added directions such as upward, obliquely upward, lateral, and obliquely downward directions. The eastward direction which has a direction number (1) is associated with eight character patterns each showing a eastward kicking action. If each of these eight character patterns is replaced in every three frames, then kicking actions are displayed in 24 frames (24/64 second).

Likewise, a "running" movement represented by a movement number (2) is associated with eight directions each associated with eight character patterns each associated a running action. A movement number (3) represents a "standing" movement. Other movements required by the design of the program, including a sliding movement, a heading movement, etc., are also made available.

Figure 8:
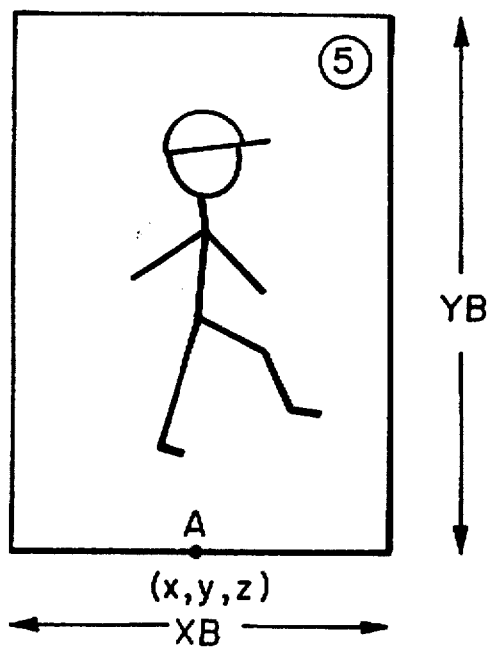
FIG. 8 is a diagram illustrative of an absolute coordinate system of the data structure of objects.

FIG. 8 illustrates an absolute coordinate system of the data structure of objects.

For each object, eight character patterns are available for one movement in one direction. FIG. 8 shows, by way of example, the fifth pattern in the eastward direction of the kicking movement. A point A at the center of the lower side of this fifth pattern is defined as an origin. The fifth pattern has its absolute coordinates at the coordinates (x, y, z) of the origin A in the absolute coordinate space.

If the absolute coordinates and the data representing the movement number, the direction number, and the pattern number are given, therefore, it is possible to determine an object in the absolute coordinate space.

Figure 9:
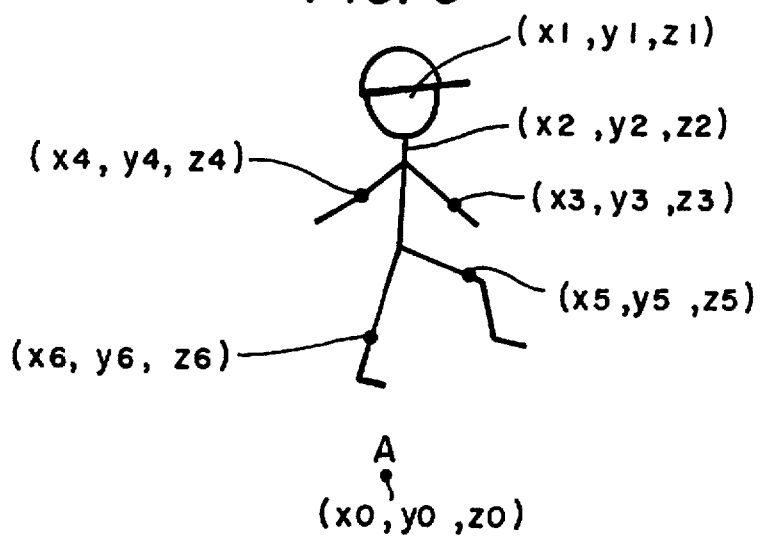
FIG. 9 is a diagram showing a modification of data of an object.

FIG. 9 shows a modification of data of an object by way of example. In the example shown in FIG. 9, an object is composed of a set of polygons representing a head, arms, legs, and a torso. The object shown in FIG. 9 has its origin A at absolute coordinates (x0, y0, z0). The respective polygons have relative coordinates (x1, y1, z1), (x2, y2, z2), - - -, (x6, y6, z6) from the origin A.

In the case where an object is composed of a set of polygons, the data of the object comprise absolute coordinates, the type of constituent polygons, and absolute coordinates and relative coordinates of the polygons. Increasing the number of polygons used results in the reproduction of a more realistic object. A much more detailed representation of an object can be achieved by adding angles around respective axes to the relative coordinates as positional information of the polygons.

However, if the number of constituent data of each object is increased, then the image processing is so complicated that it may not be suitable for use as an inexpensive television game machine for use in home. On the other hand, the complex image processing is suitable for use in arcade game machines which need to display more realistic images.

At any rate, the data of an object are composed of its absolute coordinates and additional attribute data as movement data.

[Processing of image data]

The processing in the absolute coordinate space of a player (object) controlled by the operator in the step 102 shown in FIG. 6 will be described below with reference to FIG. 4 and an example of a displayed screen.

Figure 10A:
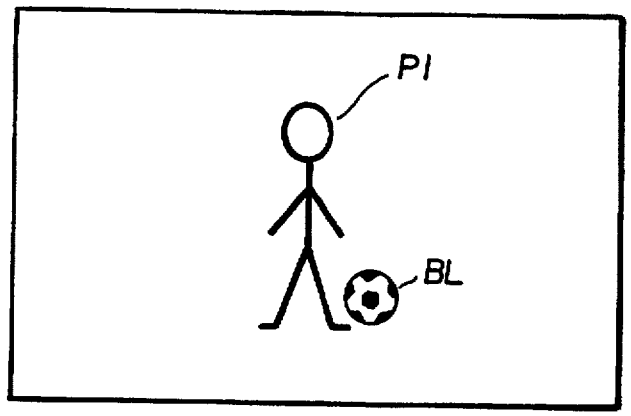
FIGS. 10(1), 10(2), and 10(3) are diagrams showing movements of a player and a ball as objects on a display screen.
Figure 10B:
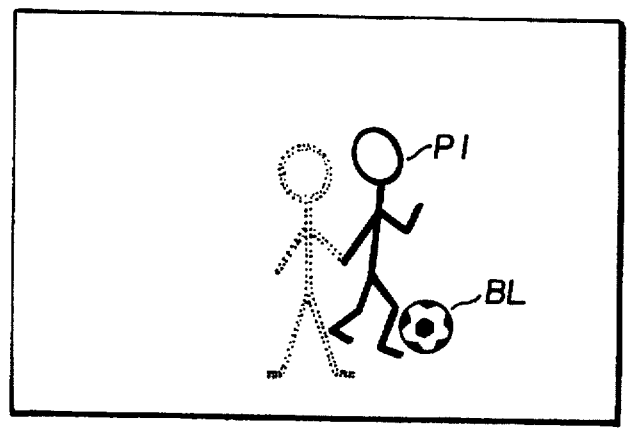
Figure 10C:
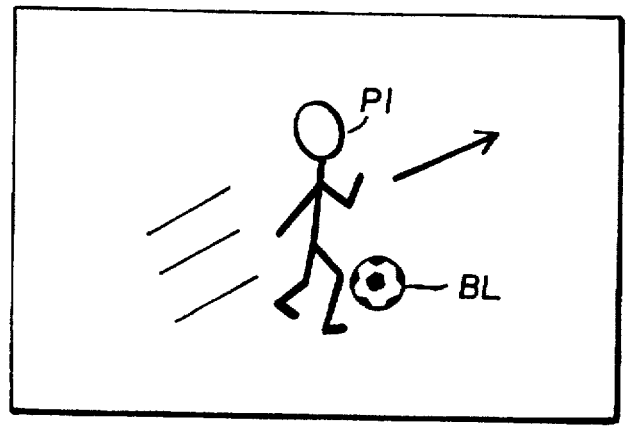

FIGS. 10(1) through 10(3) show, by way of example, movements on the display screen of a player and a ball as objects. In the illustrated example, a player P1 governing a ball BL stands as shown in FIG. 10(1), the player P1 starts running to the right due to a control signal from the operator as shown in FIG. 10(2), and the player P1 is running to the right while governing the ball BL as shown in FIG. 10(3).

It is assumed that the operator operates a directional lever button on the control pad when the player P1 is standing by the BL as shown in FIG. 10(1). The main CPU 50 recognizes a control signal from the directional lever button, and determines that the player is instructed to run to the right from the presently standing condition. If the position of the viewpoint, i.e., the position of the camera, is at 90 in FIG. 5, then since the coordinates in the display screen are the same as the absolute coordinates, the main CPU 50 recognizes the control signal as representing the player running eastward in the absolute coordinate space.

The main CPU 50 determines, through calculations, a movement number indicative of running, a direction number indicative of an eastward direction, and a pattern number indicative of running from a standing pattern, and changes the absolute coordinates in the absolute coordinate space. The main CPU 50 then stores data (absolute coordinates and movement data) of the objects in the absolute coordinate space into the memory 54. The stored data will be used for replay if a replay command is subsequently issued.

Thereafter, the main CPU 50 converts the data into those in the coordinate space for the display screen according to entered information of a replay mode, such as the position and direction of the camera, from the operator. Since the camera position is at 90 in FIG. 5 in this example, the converted data has the same direction and coordinates as those in the absolute coordinate space.

After the above processing, the main CPU 50 writes commands and character patterns required to display the corresponding objects into the video memory (VRAM) 78 of the first video display processor 68.

According to the commands and character patterns that have been stored in the video memory 78, the first video display processor 68 writes pixels of a running pattern into the frame buffer 80 or 82. As a result, the image shown in FIG. 10(2) is played back on the display monitor 74.

FIG. 10(3) shows a running movement in the next frame, which can be processed and played back in the same manner as described above.

Figure 11A:
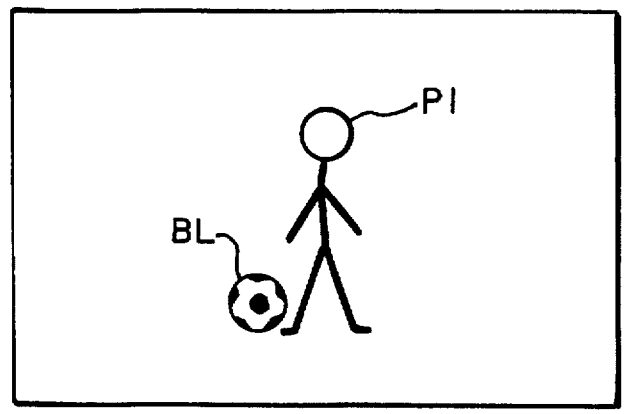
FIGS. 11(1), 11(2), and 11(3) are diagrams showing images which are a horizontal reversal (mirror image) of the images shown in FIGS. 10(1), 10(2), and 10(3)
Figure 11B:
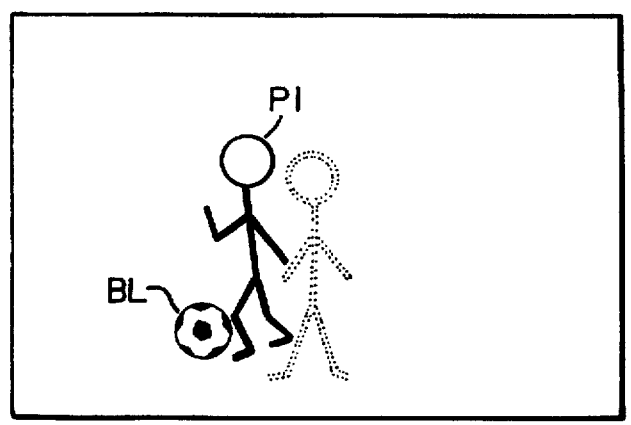
Figure 11C:
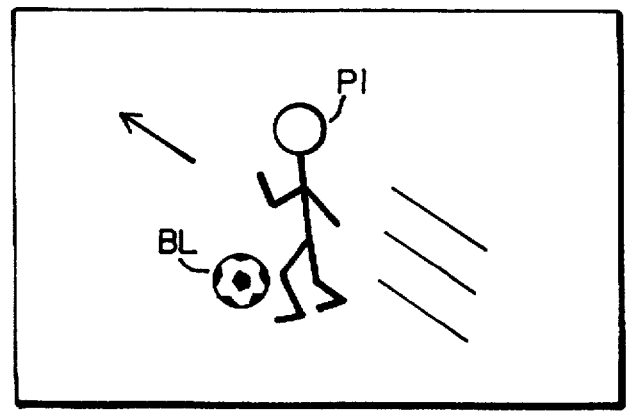

If the camera is in the position 91 shown in FIG. 5, which is on the opposite side to the position 90, then the player P1 runs in the leftward direction, and a pattern belonging to the leftward direction (corresponding to the westward direction in the absolute coordinate space). As a consequence, the images of the player P and the ball BL displayed on the display screen as shown in FIGS. 11(1) through 11(3) are a horizontal reversal (mirror image) of those shown in FIGS. 10(1) through 10(3).

Figure 12A:
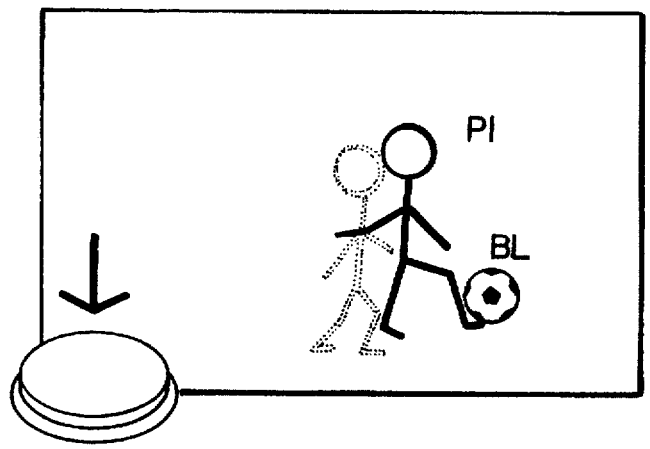
FIGS. 12(1), 12(2), and 12(3) are diagrams showing scenes when a player P1 kicks a ball BL.
Figure 12B:
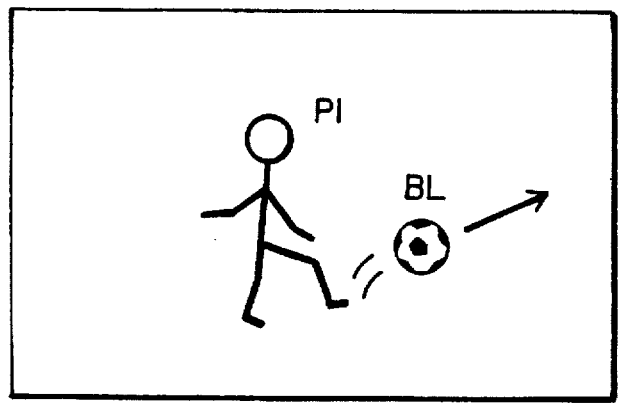
Figure 12C:
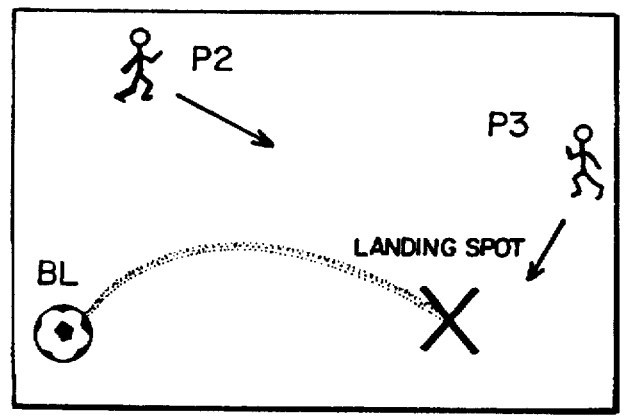

FIGS. 12(1) through 12(3) show the player P1 as he kicks the ball BL.

If the operator presses a button corresponding to a "kicking" movement on the control pad while the player P1 is running eastward in the absolute coordinate space as shown in FIGS. 10(1) through 10(3), then the main CPU 50 recognizes that the player P1 is going to make a kicking movement in the eastward direction. The main CPU 50 determines a kicking pattern in the eastward direction of the kicking movement. Determined data of the object in the absolute coordinate space are then stored in the replay data area of the memory 54 in the manner described above.

Then, the main CPU 50 processes the data for a perspective conversion based on data relative to the position and direction of the camera. If the camera remains in the position 90 shown in FIG. 5, then the objects are reproduced on the display screen as shown in FIGS. 12(1), 12(2), and 12(3).

The image processing with respect to the player and the ball controlled by the operator has been described above. Now, image processing with respect to the other players (21 or 20 players) controlled by the main CPU 50 will be described below.

Figure 13A:
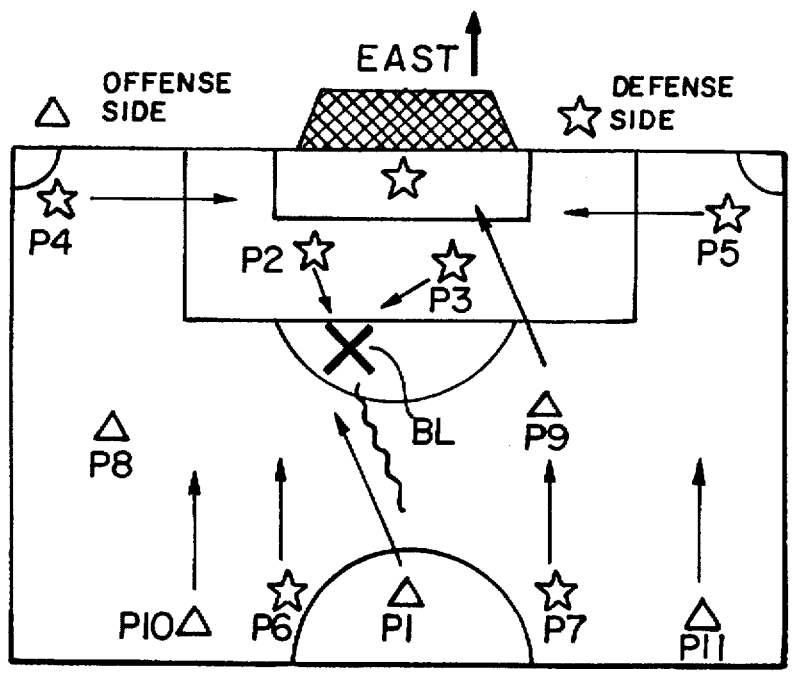
FIGS. 13(1) and 13(2) are diagrams illustrative of players and a ball that are controlled by a CPU.
Figure 13B:
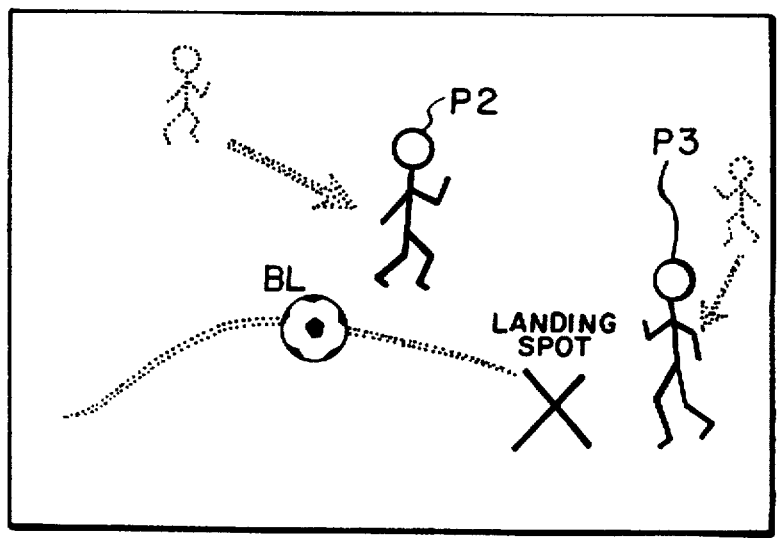

FIGS. 13(1) and 13(2) are illustrative of the players and the ball that are controlled by the main CPU 50. It is assumed that the ball BL has been kicked eastward in FIG. 12(3). Based on the information of the absolute coordinates of the ball BL which have been determined by the main CPU 50, the main CPU 50 determines movements of the other 21 players according to the algorithm of the game program.

The algorithm of the game program to determine such player movements can generally be understood from FIG. 13(1). If the ball BL moves to a point X in FIG. 13(1), then players P2, P3 close to the position of the ball BL that has moved move toward the ball BL. Other players positioned remotely from the ball BL move while keeping their given formation. Among the players, marked with a star, on the defense side, players P4, P5 move to positions in front of the goal and players P6, P7 returning toward the goal while maintaining a formation 4, 2, 4. Among the players, marked with a triangle, on the offense side, players P8–P11, in addition to the player P1 controlled by the operator, move toward the east goal.

Once the movements of the other players are determined according to the algorithm of the game program, the objects of the players are processed in the same manner as the object of the player Pi controlled by the operator. The data of the objects in the absolute coordinate space, the absolute coordinates, the movements, the directions, and the movement patterns thereof are stored in the memory 54.

The data are then processed for a perspective conversion based on data relative to the position and direction of the camera, and the processed data are written into the frame buffer. Thereafter, the second video display processor 70 combines or merges the image data in the frame buffer and the data of the background image (scrolling image) according to a given priority algorithm, and displays the merged image data on the display monitor 74. FIG. 13(2) shows the players P2, P3 running toward the ball BL.

[Data processing for the perspective conversion]

Data processing for the perspective conversion (the step 109 shown in FIG. 6), which is carried out by the main CPU 50, will be described below.

Figure 14:
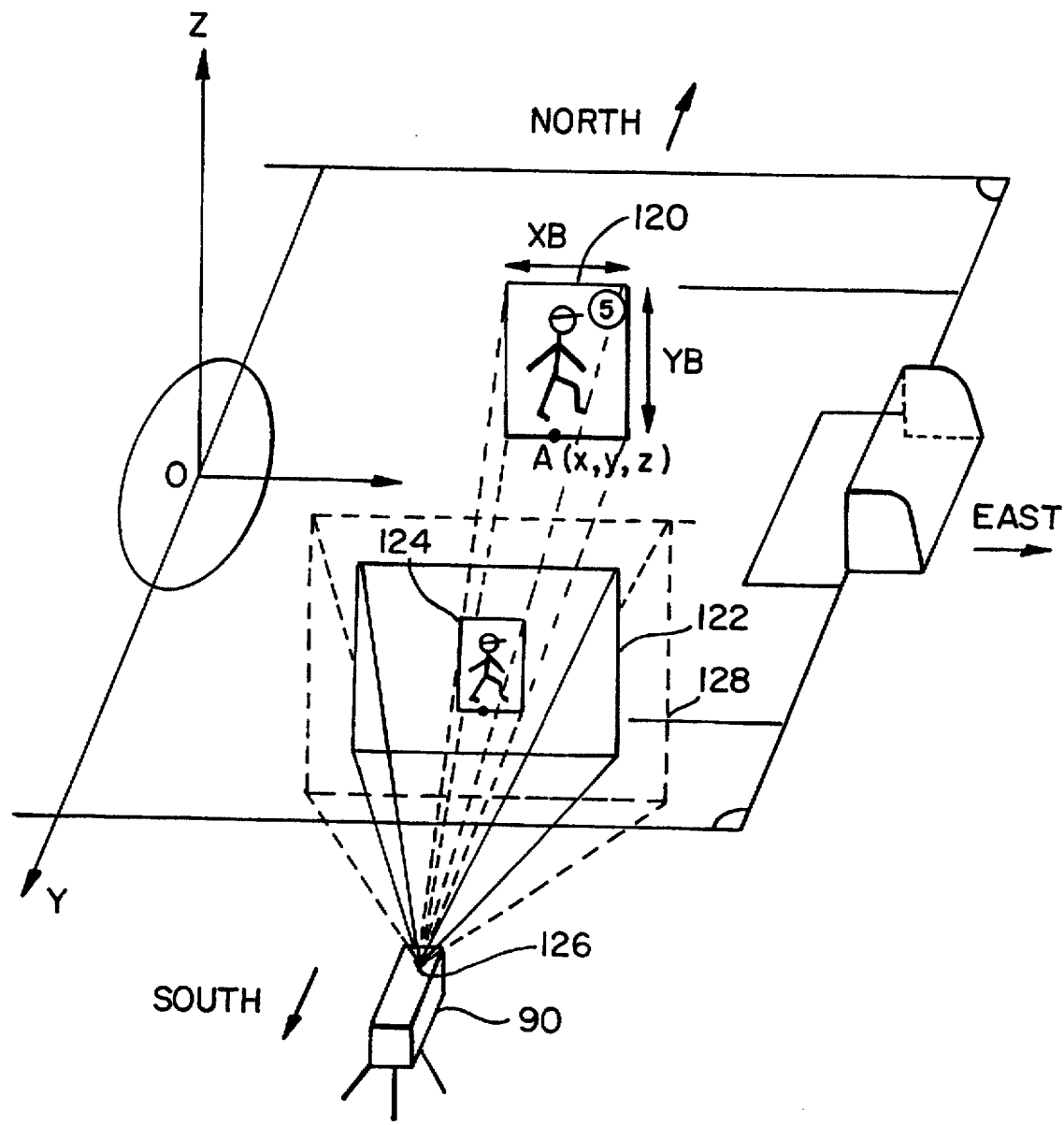
FIG. 14 is a diagram illustrative of a perspective conversion process.
Figure 15:
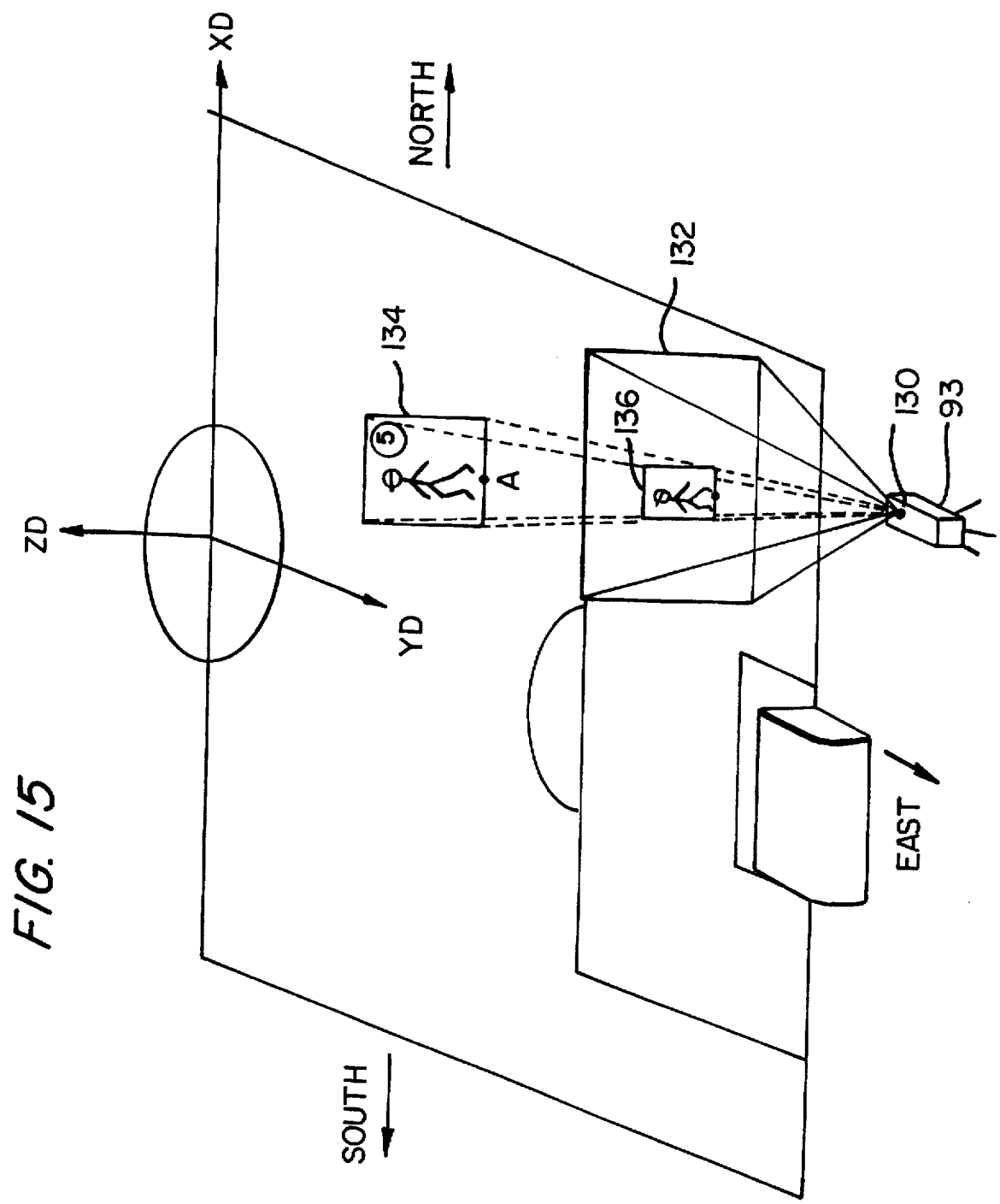
FIG. 15 is a diagram illustrative of a perspective conversion process.

FIGS. 14 and 15 are illustrative of perspective conversion processes.

It is assumed that a kicking pattern (5) in the eastward direction of a "kicking" movement to be made by a player has been determined as a result of calculations in the absolute coordinate space. FIG. 14 shows a perspective conversion process in which the camera is positioned on the south side of the soccer field, and FIG. 15 shows a perspective conversion process in which the camera is positioned on the east side of the soccer field.

In FIG. 14, the camera is positioned on the south side of the soccer field, and directed northward. Therefore, the coordinates and directions in the absolute coordinate space remain unchanged. A character pattern 120 positioned at coordinates (x, y, z) and having a kicking pattern (5) is projected as a perspective pattern 124 onto a display screen 122 which is determined by a given angle and distance and is viewed from a viewpoint at the camera 90.

Specifically, the character pattern 120 is projected onto the display screen 122 by calculating the position and size of the projected image from the origin A of the character pattern 120 and vertical and horizontal widths YB, YA of the character pattern 120 based on a viewpoint 126 of the camera 90 and the display screen 122 through similarity calculations.

If the display screen is to be zoomed out (the image reduced) with the same position and direction of the camera 90, then the display screen is indicated by the broken lines 128, and the data are calculated based on the display screen 128.

Now, the perspective conversion process shown in FIG. 15 in which the camera is positioned on the east side of the soccer field to image the same player which is making the kicking pattern (5) in the eastward direction of the kicking movement.

Various data recognized in the absolute coordinate space are converted into data adapted to the display screen based on the information representing that the camera 93 is directed from east toward west. First, directions corresponding to coordinate axes (XD, YD, ZD) which correspond to the display screen are calculated. While the eastward direction is the positive direction along the X-axis in the absolute coordinate space, the eastward direction as viewed from the camera 93 shown in FIG. 15 is the direction toward the camera 93, i.e., the positive direction along the YD axis. Therefore, the kicking pattern (5) in the southward direction (3) in the data structure shown in FIG. 7 is employed as the kicking pattern (5). This kicking pattern (5) represents a picture showing a player kicking a ball toward the front side.

After the pattern number has been determined base on the directional information, a projected pattern 136 is determined through calculations from a viewpoint 130 and direction of the camera 93, a display screen 132 determined by whether the image is to be zoomed in or out, and the coordinates of the origin A and size of a character pattern 134 whose kicking pattern (5) has changed.

[Replay function]

Operation of the game apparatus at the time a replay command is entered by the operator while the game is in progress will be described below.

Figure 16:
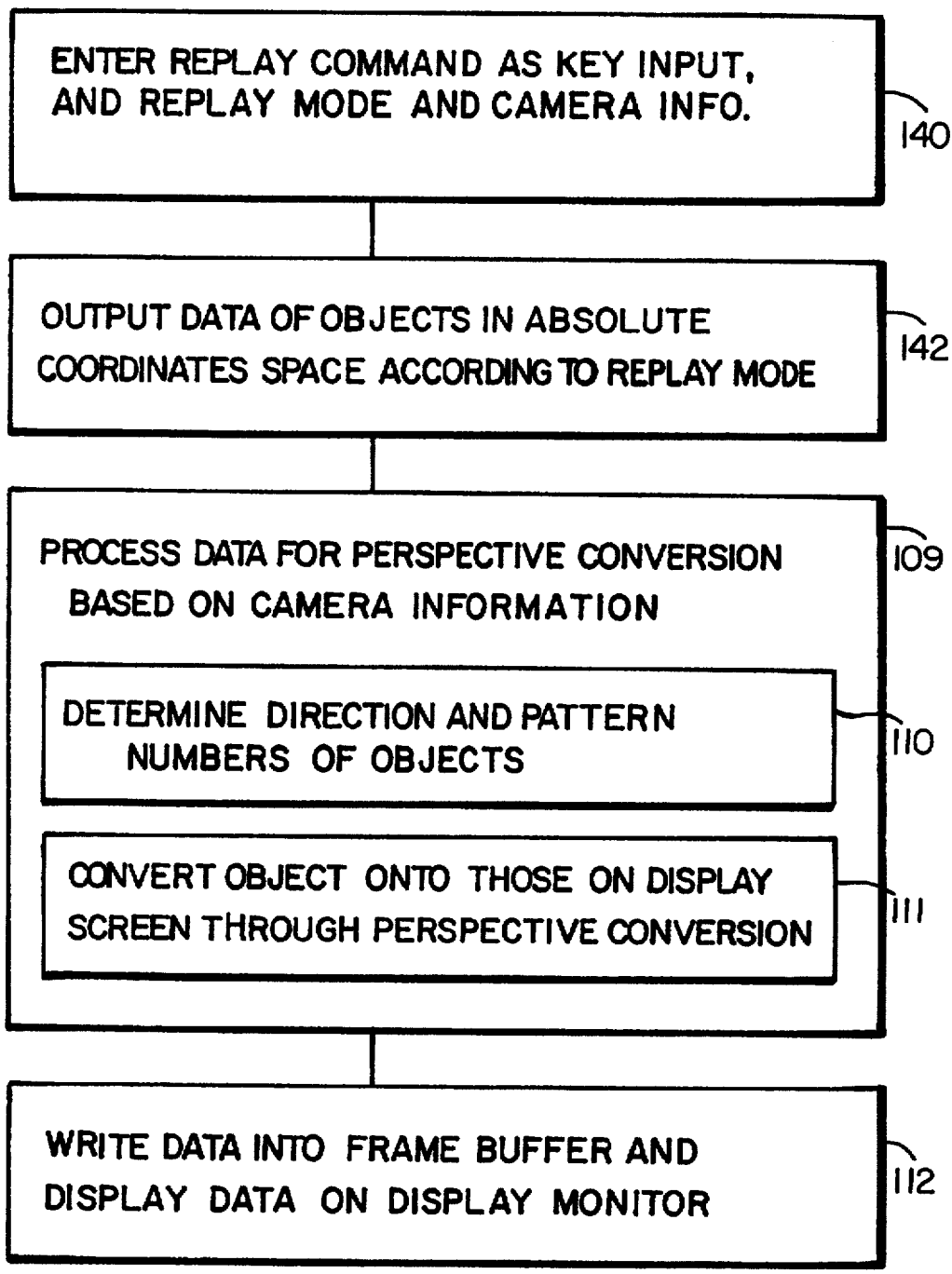
FIG. 16 is a flowchart of an operation sequence of a replay process.
Figure 17:
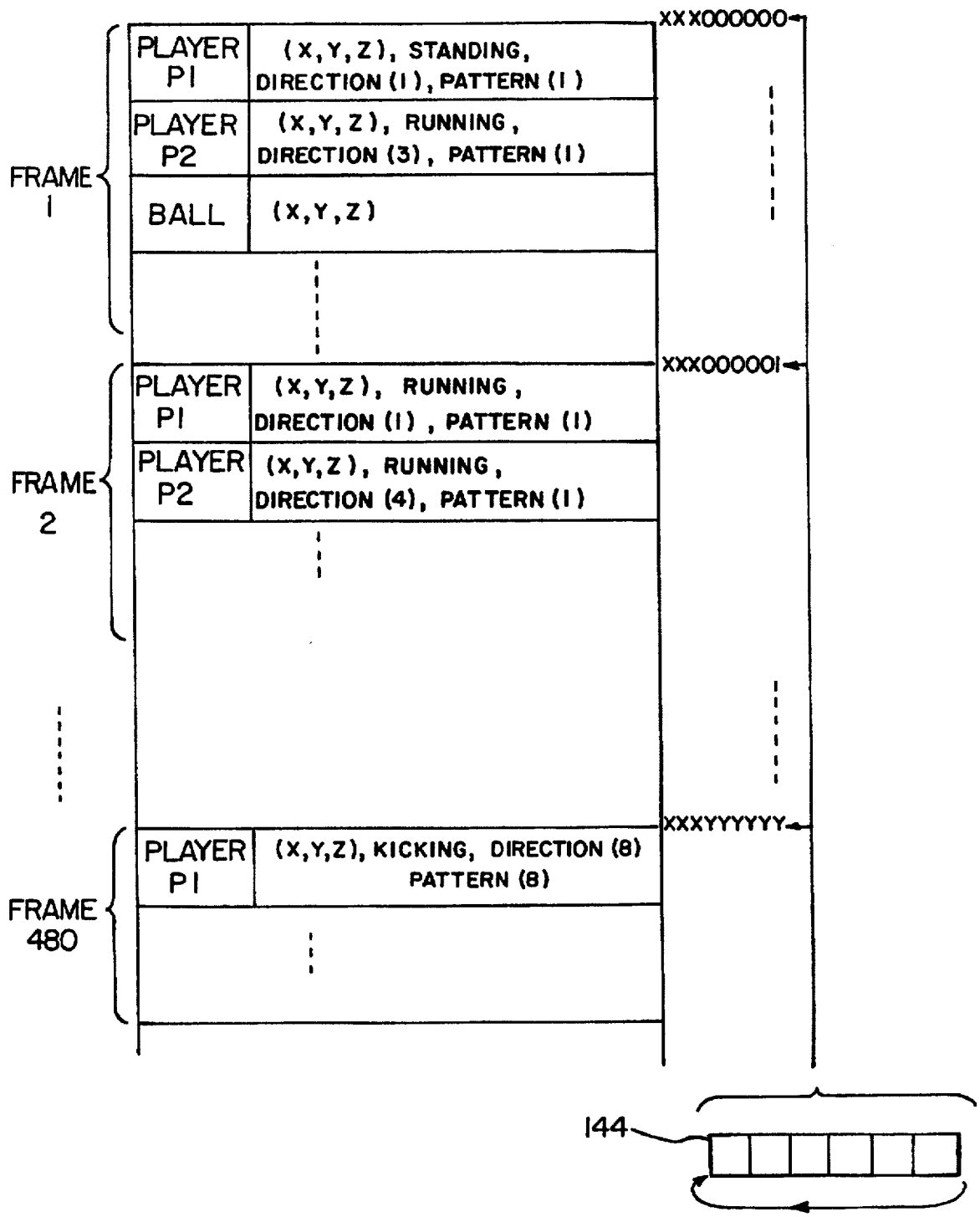
FIG. 17 is a schematic diagram of areas of replay data.

FIG. 16 shows an operation sequence of a replay process. FIG. 17 schematically shows replay data stored in a replay data area, and FIGS. 18(1) through 18(7) show 7 image frames of a scene replayed in a reverse mode with the camera position changed to a north side.

For illustrative purpose, it is assumed that the game proceeds in the absolute coordinate space in the order of FIGS. 10(1)–10(3), 12(1)–12(3), and 13(1) and 13(2).

As shown in FIG. 16, the operator enters a replay command, a replay mode (a reverse mode, a slow-motion mode, or the like) including camera information through the control pad in a step 140.

Before the replay command is entered, absolute coordinates, movements, directions, and pattern numbers of the respective objects for respective frames have been stored in the replay data area of the memory 54 by the main CPU 50.

FIG. 17 shows such replay data stored in the replay data area of the memory 54. As shown in FIG. 17, the replay data area stores, in a frame 1, data of the player P1 controlled by the operator, which include:

Absolute coordinates: (x, y, z)

Movement: Standing

Direction: Direction (1)

Pattern number: Pattern (1).

Similarly, data with respect to the player P2 and the ball are also stored in the frame 1.

The replay data area also stores similar data in a frame 2. If 8 seconds of data are stored in the replay data area of the memory 54, then since there are 60 frames a second, a total of 480 frames of data are stored in the replay data area of the memory 54.

The replay data area of the memory 54 cyclically stores data successively at addresses that are indicated by the count of a ring counter.

It is assumed that the operator enters a replay command to replay the stored data in a reverse mode with the camera positioned on the north side at the position 91 shown in FIG. 5.

In a step 142 shown in FIG. 16, the data of objects in the absolute coordinate space which are stored in the memory 54 are read backward successively from the frame 480 by the main CPU 50.

When the data are read successively from the frame 480 by the main CPU 50, the main CPU 50 processes the data for the perspective conversion based on the camera information, i.e., the position of its viewpoint, the direction of its field of view, the magnification, etc., of the replay mode. The data processing for the perspective conversion is the same as that which is effected while the game is in progress. Those steps shown in FIG. 16 which are identical to those shown in FIG. 6 are denoted by identical reference numerals.

Specifically, the direction of the object and the pattern number thereof which match the space in the display screen are determined again based on the camera information in a step 110, and a character pattern having the determined character pattern is converted into a character pattern on the display screen through the perspective conversion in a step 111. Thereafter, the main CPU 50 writes commands and character data produced as a result of the perspective conversion into the video memory 78 through the system controller unit 64. According to the commands, the first video display processor 68 converts the object into pixels of image data, and writes the pixels of image data into the frame buffers 80, 82 in a step 112.

Then, the second video display processor 70 which processes background image data, color data, etc. combines or merges the pixels of image data of the objects in the frame buffer and the data of the background image according to a given priority algorithm, and displays the merged image data on the display monitor 74.

Figure 18:
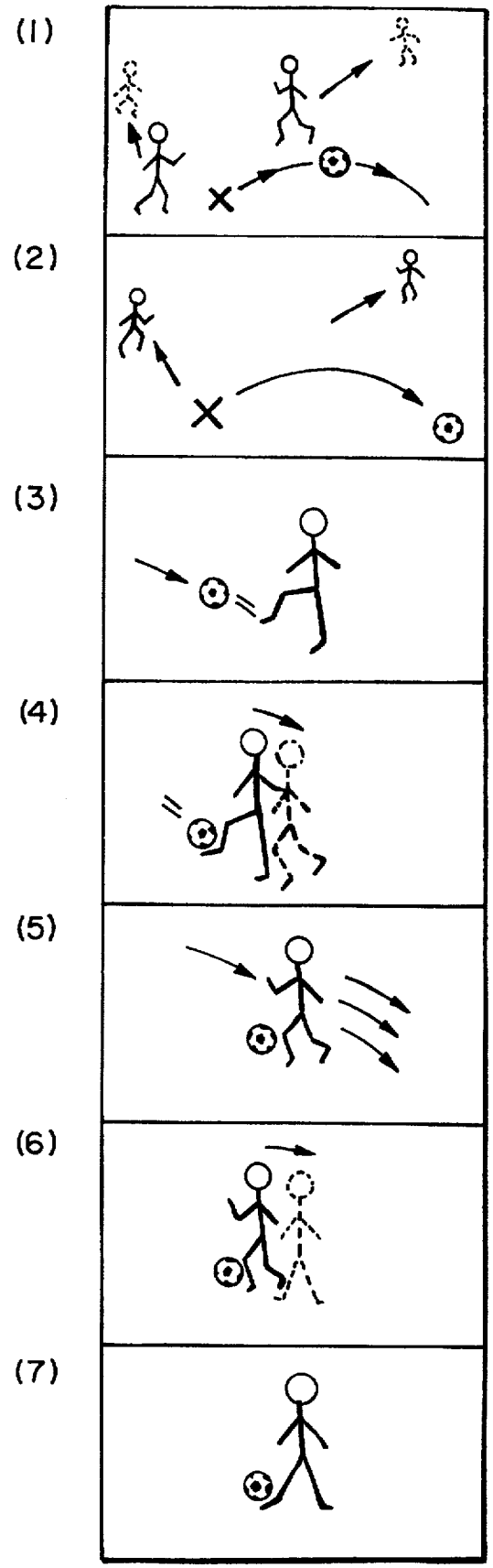
FIGS. 18(1) through 18(7) are diagrams showing 7 image frames of a scene replayed in a reverse mode with the camera position changed to a north side.

The images shown in FIGS. 10(1)–10(3), 12(1)–12(3), and 13(2) as they are replayed in the reverse mode and horizontal reversal (mirror image) are illustrated respectively in FIGS. 18(1) through 18(7).

Inasmuch as the data in the absolute coordinate space have been processed for the perspective conversion according to the camera information which is indicated for the respective frames, the images shown in FIGS. 18(1), 18(2), and 18(3) are displayed by the camera 91 on the north side, the images shown in FIGS. 18(4), 18(5) are displayed by the camera 93 on the east side, and the images shown in FIGS. 18(6), 18(7) are displayed by the camera 90 on the south side. Therefore, the images can be played back as if the camera were rotated from the north side to the east side to the south side.

If a replay command is entered with a slow-motion mode, then the data of each of the frames stored in the memory 54 are read twice and processed for the perspective conversion, so that images can be played back in the slow-motion mode.

If a replay command is entered with a fast-forward mode, then the data of only odd-numbered frames, for example, stored in the memory 54 are read and processed for the perspective conversion, so that images can be played back in the fast-forward mode.

Displayed images can be enlarged or reduced in scale simply by changing the magnification in the perspective conversion. Such image enlargement or reduction can be carried out in each of the frames.

Therefore, the game apparatus according to the present invention allows the operator to replay images dynamically in the reverse mode or the slow-motion mode at progressively enlarged scales as if the images were captured by a rotating camera.

INDUSTRIAL APPLICABILITY

In response to a replay request, scenes of a game can be displayed on a display screen based on display data, which may be rotated, enlarged, or reduced, different from those produced while the game is in progress. Therefore, it is possible to play back excellent or rare situations in the game as viewed from viewpoints different from the viewpoint while the game is in progress. As a result, the operator can enjoy the game a number of times, and have fun manifold playing the game.

Furthermore, since the game apparatus stores, for replay, image data in an absolute coordinate space which is not affected by any replay modes, any stored scenes can be replayed in an indicated replay mode which may include a reverse mode, a slow-motion mode, a fast-forward mode, zooming in, zooming out, a different camera position (viewpoint), a rotating camera position (viewpoint), etc. The operator can therefore make more fun of the game played by the game apparatus.

We claim:

1. A game apparatus comprising:
   memory means for storing, for a predetermined period of time, absolute coordinates in a predetermined area of a moving entity which moves in said predetermined area in response to a control signal entered by an operator while a game is in progress;

display data generating means for reading the absolute coordinates from said memory means in response to a replay request from the operator and processing said absolute coordinates into display data depending on processing information supplied from an input unit; and display control means for replaying the moving entity on a display screen based on said display data.

2. A game apparatus according to claim 1, wherein said display data generating means generates the display data which is different from display data produced while the game is in progress.

3. A game apparatus according to claim 1, wherein said display data generating means generates the display data from a viewpoint which is different from a viewpoint which is used while the game is in progress.

4. A game apparatus according to claim 3, wherein said display data generating means generates the display data to display the moving entity at an enlarged scale or a reduced scale by making a distance between said viewpoint and said moving entity different from a distance therebetween while the game is in progress.

5. A game apparatus according to claim 3, wherein said display data generating means generates the display data to display the moving entity by moving said viewpoint differently from the viewpoint which is used while the game is in progress.

6. A method of replaying a game in which an object is moved in a predetermined area in response to a control signal entered by an operator while the game is in progress, comprising the steps of:

storing, in a memory, a history of absolute coordinates of the object in an absolute coordinate space established in the predetermined area;

reading the history of absolute coordinates of the object from the memory in response to a replay command signal from the operator;

processing the absolute coordinates read from the memory for a perspective conversion based on input information indicative of a replay mode entered by the operator, thereby generating image data of the object to be displayed; and displaying the generated image data.

7. A method according to claim 6, wherein said input information indicative of a replay mode includes viewpoint information for replaying the image data, and said absolute coordinates are processed for a perspective conversion according to said viewpoint information.

8. A method according to claim 7, wherein said absolute coordinates are processed for a perspective conversion by making the viewpoint information for replaying the image data different from viewpoint information which is used while the game is in progress.

9. A method according to claim 7, wherein said absolute coordinates are processed for a perspective conversion by changing the viewpoint information for replaying the image data in each of the display frames.

10. A method according to claim 9, wherein said viewpoint information includes at least a position of a viewpoint and the direction of a field of a vision, and said absolute coordinates are processed for a perspective conversion by changing the position of the viewpoint or the direction of the field of the vision.

11. A method according to claim 6, wherein the history of absolute coordinates of the objects is read from the memory according to the input information indicative of a replay mode entered by the operator.

12. A method according to claim 11, wherein the history of absolute coordinates of the objects is read from the memory in a sequence which is a reversal of the sequence of the game, thereby reproducing the image data in a reverse mode.

13. A method according to claim 11, wherein the history of absolute coordinates of the objects is intermittently read from the memory, thereby reproducing the image data in a fast-motion mode.

14. A method according to claim 11, wherein the history of absolute coordinates of the objects is repeatedly read from the memory, thereby reproducing the image data in a slow-motion mode.

15. A method according to claim 6, further comprising the steps of calculating a position in the absolute coordinate space to which the object moves, in response to the control signal entered by the operator with respect to images displayed while the game is in progress, thereby generating absolute coordinates of the object, and storing a history of the absolute coordinates in the memory.

16. A method according to claim 6, further comprising the steps of:

calculating a position in the absolute coordinate space to which the object moves, in response to a control signal entered by the operator with respect to images displayed while the game is in progress, thereby generating absolute coordinates of the object;

determining movement data of said object in the absolute coordinate space;

storing a history of the absolute coordinates and the movement data in the memory;

reading the history of the absolute coordinates and the movement data from the memory in response to a replay command signal from the operator; and processing the absolute coordinates and the movement data which have been read from the memory, for a perspective conversion.

17. A method of replaying a game in which an object is moved in a predetermined area in response to a control signal entered by an operator while the game is in progress, comprising the steps of:

determining absolute coordinates and movement data of the object in an absolute coordinate space established in the predetermined area in response to the control signal entered by the operator with respect to images displayed while the game is in progress;

storing a history of the absolute coordinates and the movement data of the object in a memory;

reading the absolute coordinates and the movement data of the object from the memory in response to input information indicative of a replay command and a replay mode from the operator;

processing the absolute coordinates and the movement data which are read for a perspective conversion according to said input information, thereby generating image data of the object to be displayed; and displaying the generated image data.

18. A method according to claim 17, wherein said input information indicative of a replay mode includes viewpoint information for replaying the image data, and said absolute coordinates are processed for a perspective conversion according to said viewpoint information.

19. A method according to claim 18, wherein said absolute coordinates are processed for a perspective conversion by making the viewpoint information for replaying the image data different from viewpoint information which is used while the game is in progress.

20. A method according to claim 18, wherein said absolute coordinates are processed for a perspective conversion by changing the viewpoint information for replaying the image data in each of the display frames.

21. A method according to claim 20, wherein said viewpoint information includes at least a position of a viewpoint and a direction of a field of the vision, and said absolute coordinates are processed for a perspective conversion by changing the position of the viewpoint or the direction of the field of vision.

22. A method according to claim 17, wherein the history of absolute coordinates of the objects is read from the memory according to the input information indicative of a replay mode entered by the operator.

23. A method according to claim 22, wherein the history of absolute coordinates of the objects is read from the memory in a sequence which is a reversal of the sequence of the game, thereby reproducing the image data in a reverse mode.

24. A method according to claim 22, wherein the history of absolute coordinates of the objects is intermittently read from the memory, thereby reproducing the image data in a fast-motion mode.

25. A method according to claim 22, wherein the history of absolute coordinates of the objects is repeatedly read from the memory, thereby reproducing the image data in a slow-motion mode.

26. A method of replaying a game in which objects are moved in a predetermined area in response to a control signal entered by an operator while the game is in progress, comprising the steps of:
   determining absolute coordinates and movement data of a first object in an absolute coordinate space established in the predetermined area in response to the control signal entered by the operator with respect to images displayed while the game is in progress;
   determining absolute coordinates and movement data of a second object in the absolute coordinate space based on the absolute coordinates and the movement data of the first object according to a predetermined algorithm of a game program;
   storing a history of the absolute coordinates and the movement data of the first and second objects in a memory;
   reading the absolute coordinates and the movement data of the first and second objects from the memory in response to input information indicative of a replay command and a replay mode from the operator;
   processing the absolute coordinates and the movement data which are read for a perspective conversion according to said input information indicative of a replay mode, thereby generating image data of the first and second objects to be displayed; and
   displaying the generated image data.

27. A method according to claim 26, wherein said input information includes viewpoint information for replaying the image data, and said absolute coordinates are processed for a perspective conversion according to said viewpoint information.

28. A method according to claim 27, wherein said absolute coordinates are processed for a perspective conversion by making the viewpoint information for replaying the image data different from viewpoint information which is used while the game is in progress.

29. A method according to claim 27, wherein said absolute coordinates are processed for a perspective conversion by changing the viewpoint information for replaying the image data in each of the display frames.

30. A method according to claim 29, wherein said viewpoint information includes at least a position of a viewpoint and a direction of a field of a vision, and said absolute coordinates are processed for a perspective conversion by changing the position of the viewpoint or the direction of the field of vision.

31. A method according to claim 26, wherein the history of absolute coordinates of the objects is read from the memory according to the input information indicative of a replay mode entered by the operator.

32. A method according to claim 31, wherein the history of absolute coordinates of the objects is read from the memory in a sequence which is a reversal of the sequence of the game, thereby reproducing the image data in a reverse mode.

33. A method according to claim 31, wherein the history of absolute coordinates of the objects is intermittently read from the memory, thereby reproducing the image data in a fast-motion mode.

34. A method according to claim 31, wherein the history of absolute coordinates of the objects is repeatedly read from the memory, thereby reproducing the image data in a slow-motion mode.

35. A game apparatus for moving and displaying an object in a predetermined area in response to a control signal entered by an operator while a game is in progress, comprising:
   an input unit for entering a control signal from the operator;
   a memory;
   a processor connected to said input unit and said memory, for storing a history of absolute coordinates of the object in an absolute coordinate space established in the predetermined area into said memory, reading the history of absolute coordinates of the object from said memory in response to a replay command entered from said input unit by the operator, and processing the absolute coordinates which are read for a perspective conversion in response to input information indicative of a replay mode entered from the input unit by the operator, thereby generating image data of the object to be displayed; and
   an video display control unit connected to said processor, for displaying the generated image data.

36. A game apparatus according to claim 35, wherein said processor calculates a position in the absolute coordinate space to which the object moves, in response to the control signal entered by the operator with respect to images displayed while the game is in progress.

37. A game apparatus according to claim 35, wherein said processor:
   calculates a position in the absolute coordinate space to which the object moves, in response to the control signal entered by the operator with respect to images displayed while the game is in progress, thereby generating absolute coordinates of the object;
   determines movement data of said object in the absolute coordinate space;
   stores a history of the absolute coordinates and the movement data in the memory;
   reads the history of the absolute coordinates and the movement data from the memory in response to a replay command signal from the operator; and processes the absolute coordinates and the movement data which have been read from the memory, for a perspective conversion.

38. A game apparatus for moving and displaying an object in a predetermined area in response to a control signal entered by an operator while a game is in progress, comprising:

an input unit for entering input information indicative of the control signal, a replay command signal, and a replay mode from the operator;

a memory;

a processor for determining absolute coordinates and movement data of the object in an absolute coordinate space established in the predetermined area in response to the control signal entered by the operator with respect to images displayed while the game is in progress, storing a history of the absolute coordinates and the movement data of the object in said memory, reading the absolute coordinates and the movement data of the object from the memory in response to the input information indicative of a replay command and a replay mode from the operator, and processing the absolute coordinates and the movement data which are read for a perspective conversion according to said input information indicative of a replay mode, thereby generating image data of the object to be displayed; and an image display control unit connected to said processor, for displaying the generated image data.

39. A game apparatus for moving and displaying objects in a predetermined area in response to a control signal entered by an operator while a game is in progress, comprising:

an input unit for entering input information indicative of the control signal, a replay command signal, and a replay mode from the operator;

a memory;

a processor for determining absolute coordinates and movement data of a first object in an absolute coordinate space established in the predetermined area in response to the control signal entered by the operator with respect to images displayed while the game is in progress, determining absolute coordinates and movement data of a second object in the absolute coordinate space based on the absolute coordinates and the movement data of the first object according to a predetermined algorithm of a game program, storing a history of the absolute coordinates and the movement data of the first and second objects in said memory, reading the absolute coordinates and the movement data of the first and second objects from the memory in response to the input information indicative of a replay command and a replay mode from the operator, and processing the absolute coordinates and the movement data which are read for a perspective conversion according to said input information indicative of a replay mode, thereby generating image data of the first and second objects to be displayed; and an image display control unit connected to said processor, for displaying the generated image data.

40. A video game apparatus for permitting a player to enter command signals that are processed with a stored game program to provide video images of the game, comprising:

a video display for providing images that move on a coordinate system;

means for storing a game program;

a player control unit for inputting control signals to control the game play of the game program including a control member for controlling an object that is enabled to move in the coordinate system relative to the video display, a replay command member for providing a replay of game images, and a replay mode member for specifying a particular characteristic of replay operation;

computer means for processing the game program and player control unit signals to drive the video display images, including means for calculating absolute coordinates and determining direction of object movement;

first storage means for temporarily and continuously storing a predetermined number of absolute coordinates representative of object movement that have been displayed on the video display and control signals and periodically writing over the stored absolute coordinate and control signals with new absolute coordinate and control signals of subsequent object movement; and second storage means, in response to the replay command member, for storing a predetermined number of absolute coordinates and control signals, whereby the replay command member enables the stored absolute coordinates and control signals in the second storage means to be processed by the computer means to provide a replay of game action and the replay mode member can alter the replay to vary the mode of replay of the images compared to the original game play.

41. The invention of claim 40, wherein the absolute coordinates are coordinates of polygons of objects arbitrarily established in a region in which the objects move.

42. The invention of claim 41 further including means for providing a perspective conversion based on the stored absolute coordinates and control signals to convert three-dimensional data in the absolute coordinate space into two-dimensional data for the video display.

43. The invention of claim 40 further including a ring counter and the first storage means adds a count of the ring counter to an address for storing the absolute coordinate and control signals.

* * * * *